United States Patent [19]

Date et al.

[11] Patent Number: 5,032,863
[45] Date of Patent: Jul. 16, 1991

[54] CAMERA SHUTTER AND VIEWFINDER CONTROL APPARATUS

[75] Inventors: Nobuaki Date; Akio Sunouchi, both of Kawasaki; Syuichiro Saito, Yokohama; Yoshitaka Murata, Yokohama; Yukio Ogawa, Yokohama; Nobuo Tezuka, Kawasaki, all of Japan

[73] Assignee: Canon Kabushiki Kaisha, Tokyo, Japan

[21] Appl. No.: 488,449

[22] Filed: Feb. 27, 1990

Related U.S. Application Data

[60] Division of Ser. No. 391,716, Aug. 7, 1989, which is a continuation of Ser. No. 945,948, Dec. 24, 1986, abandoned.

[30] Foreign Application Priority Data

| Dec. 28, 1985 | [JP] | Japan | 60-297472 |
| Dec. 28, 1985 | [JP] | Japan | 60-297473 |
| Dec. 28, 1985 | [JP] | Japan | 60-297474 |
| Dec. 28, 1985 | [JP] | Japan | 60-297475 |
| Dec. 28, 1985 | [JP] | Japan | 60-297476 |
| Dec. 28, 1985 | [JP] | Japan | 60-297477 |
| Dec. 28, 1985 | [JP] | Japan | 60-297478 |

[51] Int. Cl.$^5$ .......................... G03B 9/10; G03B 19/12
[52] U.S. Cl. .......................... 354/441; 354/225; 354/152; 354/250; 354/258.1; 354/265; 358/224; 358/225
[58] Field of Search .............. 354/441, 225, 228, 152, 354/250, 258.1, 235.1, 265; 358/224, 225

[56] References Cited

U.S. PATENT DOCUMENTS

| 3,522,765 | 8/1970 | Johnson | 354/235.1 |
| 3,526,455 | 9/1970 | Barnette | 354/250 |
| 3,887,934 | 6/1975 | Ettischer | 354/265 |
| 3,956,761 | 5/1976 | Koch et al. | 354/258.1 |
| 4,015,198 | 3/1977 | Iwashita et al. | 354/441 |
| 4,306,793 | 12/1981 | Date et al. | 354/228 |
| 4,313,658 | 2/1982 | Sugiura et al. | 354/152 |
| 4,677,489 | 6/1987 | Nishimura et al. | 358/225 |
| 4,734,777 | 3/1988 | Okino et al. | 358/228 |
| 4,825,302 | 4/1989 | Tezuka et al. | 358/335 |

*Primary Examiner*—Russell E. Adams
*Attorney, Agent, or Firm*—Fitzpatrick, Cella, Harper & Scinto

[57] ABSTRACT

A shutter device for a still video camera comprises first and second shutter blades, a latch member and an unlatch member. The latch member latches the first blade at its moved position where an image pickup element is exposed to an image light. The first blade is kept latched for a preparatory exposure to correct a set exposure value on the basis of the output of the pickup element or for picking up a motion picture. The unlatch member releases the latching of the first blade. In one embodiment, the unlatch member is provided on the second blade to unlatch the first blade when the second blade is moved to terminate the exposure. In other embodiments, the unlatch member includes an electromagnet to unlatch the first blade.

A still video camera comprises a view finder mirror and a mirror operating mechanism. The mechanism includes a motor and is arranged to retract and return the mirror relative to an optical path by utilizing a normal and a reverse rotation of the motor, respectively.

In the disclosed embodiments, the camera further comprises a mechanism to maintain the mirror in the retracted condition and a shutter in the opened condition to operate in a motion video mode where an image pickup element is continuously exposed to an image light. The mechanism for setting in the motion video mode may be operable manually from the exterior of the camera or by connecting an external device to the camera.

17 Claims, 27 Drawing Sheets

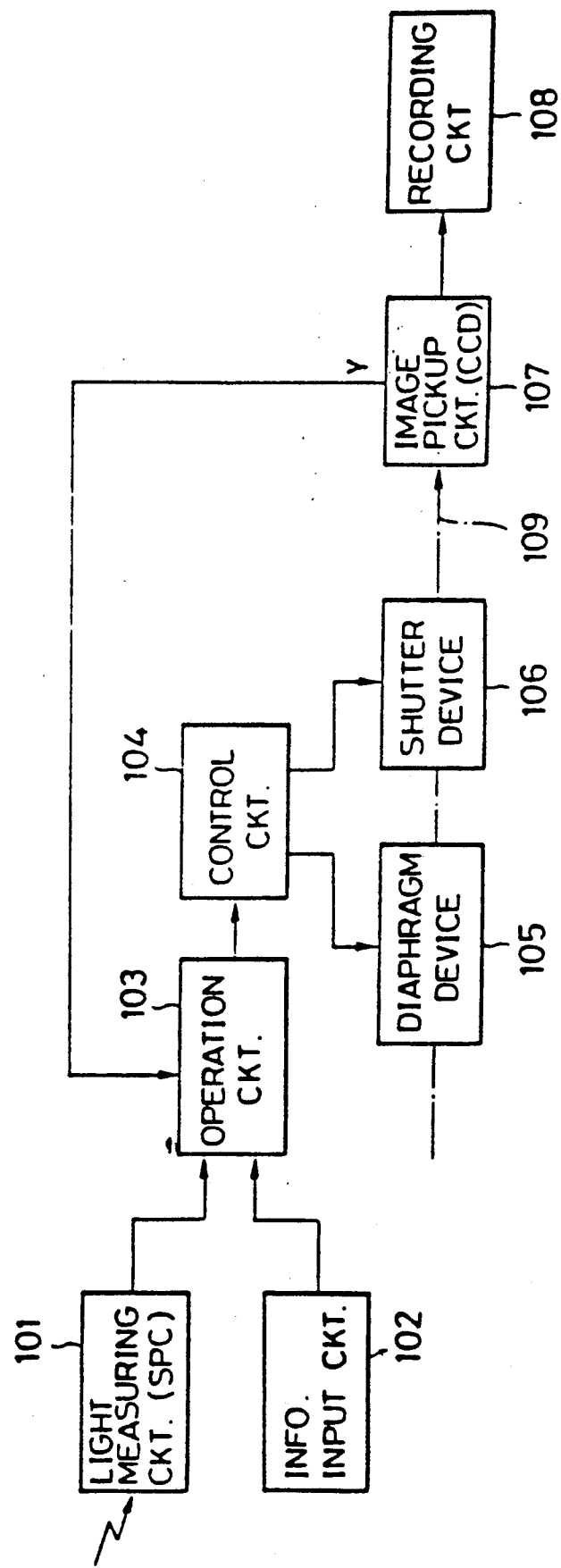

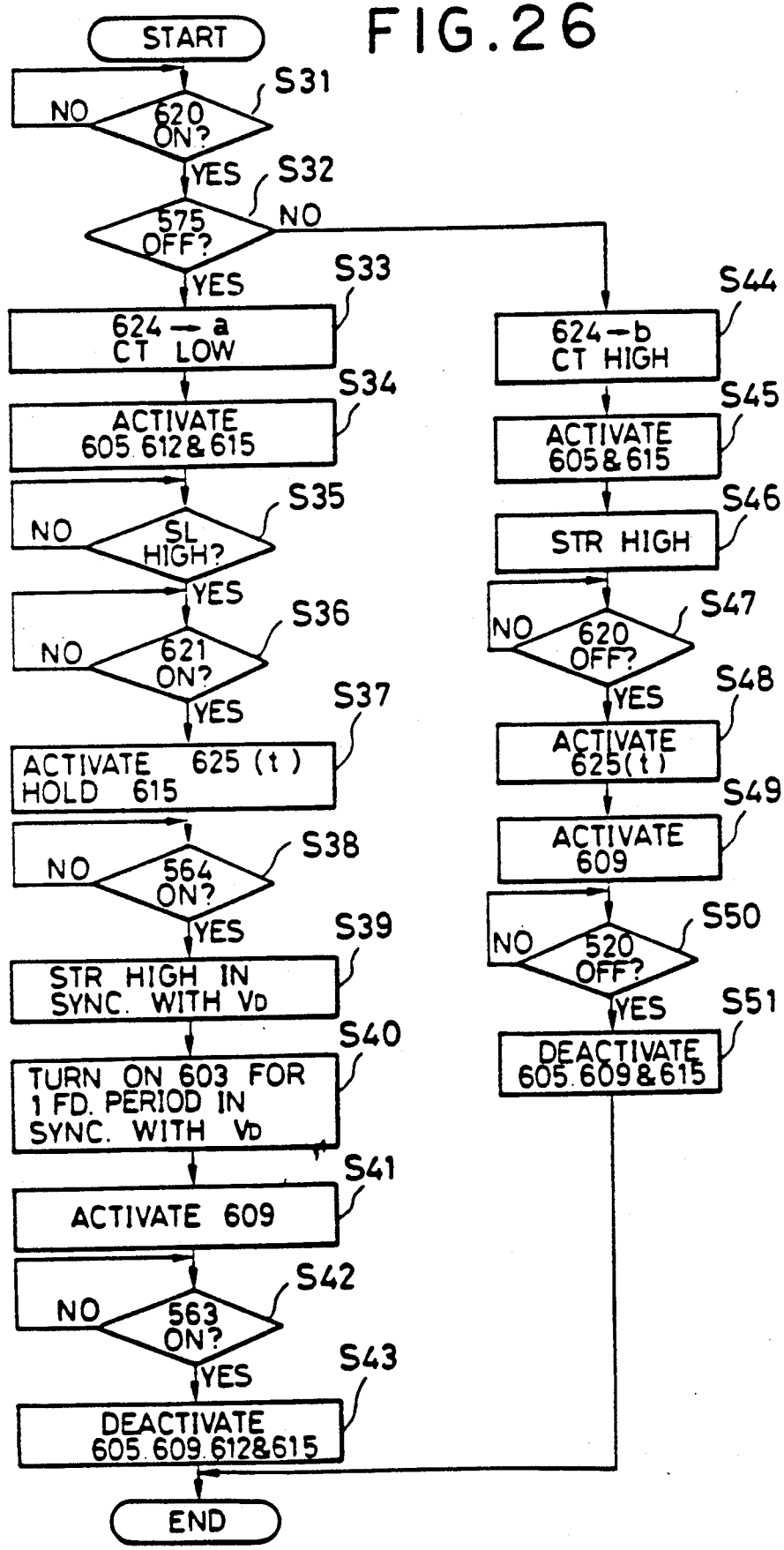

CAMERA SHUTTER AND VIEWFINDER CONTROL APPARATUS

This application is a division of allowed application Ser. No. 391,716 filed Aug. 7, 1989, which is a continuation of Ser. No. 945,948 filed Dec. 24, 1986, the latter now abandoned.

BACKGROUND OF THE INVENTION

1. Field of the Invention

The present invention in one aspect relates to a camera shutter control. In another aspect the present invention relates to a camera having a single lens reflex view finder structure. More particularly, in this aspect the present invention concerns a camera having viewfinder optical means which is arranged to be retracted from an optical path at the time of picture taking and then returned to an original position in the optical path.

2. Description of the Related Art

Recently, there have been significant developments in connection with still video cameras which use an image pickup element such as a CCD to convert a light image into a corresponding electrical signal and to record the signal magnetically on a medium such as a video floppy disc.

In a still video camera, an automatic exposure (AE) control system of high precision is required in view of the narrowness of the dynamic range of the image pickup element. Thus, though it could be possible to control a stop value or a shutter speed based on an output of a photocell such as a silicon photocell (SPC) for measuring the object brightness, like in a film camera, it is difficult to construct an AF control system of high precision with that method due to the difference in the sensitivity and in the dynamic range between the image pickup element and the photocell.

In view of the above, there has been provided an AE control in which the image pickup element is first exposed to the image light for the purpose of determining the stop value or the shutter speed on the basis of the output of the photocell (a preparatory exposure). The stop value or the shutter speed is corrected based on the then obtained luminous output of the image pickup element to carry out the exposure of the pickup element for the image pickup (a true exposure). Thereafter the image pickup element is again exposed to the image light for the purpose of taking the picture.

FIG. 1 shows one example of such an AE control system. In the system shown in FIG. 1, a light measuring circuit 101 includes a photocell (SPC) and produces an output signal representing an object brightness. An information input circuit 102 produces information signals representing a et shutter speed (i.e. exposure time) or a set stop value (i.e. aperture size) and a full-open lens F-Number. In operation, circuit 103 is connected to receive the output signals from the circuits 101 and 102. A control circuit 104 is connected to receive the output signal from the operation circuit 103 and to control a diaphragm device 105 and a shutter device 106 based thereon. An image pickup circuit 107 includes an image pickup element (CCD) and produces an image signal and a luminous signal Y. A recording circuit 108 is connected to receive the output signal from the pickup circuit 107 and to record the signal on a medium such as a magnetic disc. The operation circuit 103 is connected to receive the luminous signal Y produced by the pickup circuit 107 and to connect the shutter speed and/or the stop value based thereon.

The operation circuit 103 determines an appropriate stop value or shutter speed on the basis of the output signals of the light measuring circuit 102 and of the information input circuit 102. Based on the output of the operation circuit 103, the control circuit 104 operates to stop down the diaphragm device 105 to the determined or set stop value and to open the shutter device 106 a certain period of time to expose the image pickup element (CCD) in the image pickup circuit 107 to the image light 109 (preparatory exposure). Thus, the pickup circuit 107 produces, together with the image signal, the luminous signal Y indicative of the object brightness. In response thereto, the operation circuit 103 corrects the set or determined shutter speed and/or the determined or set stop value. Then, the control circuit 104 operates the diaphragm device 105 and the shutter device 106 based on the corrected output of the operation circuit 103 to expose the pickup element (CCD) in the pickup circuit 107 under the most proper condition (true exposure). Thus, the most appropriate image signal is produced by the pickup circuit 107 and is recorded in the recording circuit 108.

In this system, the shutter device must be kept opened for a certain period of time for the preparatory exposure while it should be kept closed in an unused condition of the camera in order to protect the image pickup element from being damaged by the high intensity light etc.

However, if an electromagnetically driven focal plane type shutter device is used for the above mentioned shutter device, an electromagnet for driving a first one of shutter blades must be kept energized during the preparatory exposure to maintain the shutter device opened and this causes much consumption of electrical power.

Moreover, if a motion picture is to be taken with the above mentioned still video camera like a normal video camera, the shutter device should be kept opened for a whole period of the motion picture taking and this causes much more consumption of electrical power.

As is well known in the art, a single lens reflex type camera must have a mechanism for retracting a viewfinder mirror from an optical path at the time of picture taking and for thereafter returning the mirror to its original position in the optical path. Generally, such mechanism includes a spring as a driving source for quick movement of the mirror.

One well known film camera incorporates a manual for built-in motor type automatic wind-up mechanism; and the charging of the spring for mirror retraction is -performed together with the film wind-up by the wind-up mechanism. Also, the releasing of a clutch for mirror return and the latching of the wind-up mechanism are performed by the operation of a shutter.

However, in the case of a still video camera using a video floppy disc, the film wind-up mechanism may be of no use and therefore it is not possible to charge the spring for mirror return by the film wind-up mechanism.

Moreover, in the case of a still video camera, a very small and hence lightly operative shutter can be used because the picture size of the still video camera is about one fourth of that of a 35 mm film camera. Therefore, it may be very difficult to release the clutch for mirror return by the operation of such a small and lightly operative shutter.

Furthermore, it is not advisable to prepare an electromagnet solely for the releasing of the clutch for mirror return.

Other than the above, it would be very convenient to take with the above mentioned still video camera, a motion picture like in a normal video camera, as well as a still picture. In this case, it would also be convenient to use an EVF (Electronic ViewFinder) to monitor the image signal. Furthermore, it would be highly convenient if a VCR (Video Cassette Recorder) could be connected to the still video camera to record the picked up motion picture.

SUMMARY OF THE INVENTION

According to one aspect of the present invention, there is provided a camera which comprises first and second shutter members, latch means and unlatch means. The first shutter member is movable between a rest position where it closes an aperture and a moved position where it opens the aperture. The second shutter member is also movable between a rest position where it opens the aperture and a moved position where it closes the aperture. The latch means latches the first shutter member at its moved position. The unlatch means is responsive to movement of the second shutter member to its moved position to release the latch means.

The camera may further comprise detection means and shutter control means. The detection means detects a scene brightness when the aperture is opened by the movement of the first shutter member to its moved position. The shutter control means causes the second and the first shutter member to be returned, in the named order, from their respective moved to their respective rest positions with a time delay controlled on the basis of the scene brightness detected by the detection means, therebetween. The shutter control means may be further arranged to cause the first and second shutter members to be moved, in the named order, from their respective rest positions to their respective moved positions with a predetermined time delay therebetween.

The shutter control means may include first and second electromagnetic means for moving the first and second shutter members, respectively, and circuit means for controlling the first and second electromagnetic means.

The camera may further comprise first and second urging members for urging the first and second shutter members toward their respective rest positions, respectively, and first and second stopper members for stopping the first and second shutter members at their respective rest positions, respectively. In this case, the first and second electromagnetic means are arranged to move the first and second shutter members to their respective moved positions and to hold the there against the first and second urging members, respectively.

When the camera comprises a viewfinder mirror and means for moving the mirror between a viewing position in an optical path and a retracted position out of the optical path, the latch means may be arranged to be responsive to the moving means to latch the first shutter member at its moved position when the mirror is moved to the retracted position by the moving means. Alternatively, when the camera comprises a diaphragm device and means for stopping down the diaphragm device, the latch means may be arranged to be responsive to the stop down means to latch the first shutter member at its moved position when the stop down means stops down the diaphragm device. The camera may further comprise means for operating the latch means after the first shutter member has been moved to its moved position.

According to another aspect of the present invention, there is provided a camera which comprises a first and a second shutter member, latch means and unlatch means. The first shutter member is movable between a rest position where it closes an aperture and a moved position where it opens the aperture. The second shutter member is also movable between a rest position where it opens the aperture and a moved position where it closes the aperture. The latch means latches the first shutter member at its moved position. The unlatch means includes an electromagnet to release the latching of the first shutter member by the latch means.

The camera of this embodiment may further comprise unlatch control means for causing the unlatch means to release the latching of the first shutter member by the latch means when the second shutter member is moved to its moved position. The unlatch control means is connected to energize the electromagnet.

According to a further aspect of the present invention, there is provided a camera which comprises first and second shutter members, latch means, trigger means and unlatch means. The first shutter member is movable between a rest position where it closes an aperture and a moved position where it opens the aperture. The second shutter member is also movable between a rest position, where it opens the aperture, and a moved position where it closes the aperture. The latch means is provided for latching the first shutter member at its moved position. The trigger means includes an electromagnet to cause the latch means to latch the first shutter member. The unlatch means is responsive to the second shutter member to release the latching of the first shutter member by the latch means when the second shutter member is moved to its moved position.

The camera of this embodiment may further comprise trigger control means for operating the trigger means after the first shutter member has been moved to its moved position. The trigger control means is connected to the electromagnet. Other than the above, the same embodiment structures as those in the first and the second aspect can be applied unless they are inconsistent.

Thus, it becomes possible to greatly lessen the consumption of the electrical power which is necessary to keep the electromagnetic drive shutter opened for a certain period of time.

According to a further aspect of the present invention, there is provided a camera which comprises viewfinder optical means, prime mover means, a retracting mechanism, latch means, unlatch means, and a reset mechanism. The optical means is supported movably between a first position in an optical path and a second position out of the optical path. The prime mover means has an output member which is alternatively movable in first and second directions. The retracting mechanism moves the optical means from the first to the second position. The latch means latches the retracting mechanism. The unlatch means is also responsive to the movement of the output member of the prime mover means in the first direction to release the latching of the retracting mechanism by the latch means to thereby enable the retracting means to move the optical means from the first to the second position. The reset mechanism is responsive to the movement of the output member of the prime mover means in the second direction to reset the optical means at the first position and the retracting mechanism at a condition operative to move the optical means from the first to the second position.

The camera of this embodiment may include energy storing means and may be arranged to operate by energy stored in the storing means. The storing means may be arranged to store energy when the retracting mechanism is reset by the reset mechanism. The latch means may be arranged to latch the retracting mechanism with the storing means storing energy. The storing means may include a spring. The retracting means may also include releasable clutch means and the reset means may include urging means and release means. The urging means urges the optical means toward the first position. The release means is responsive to the movement of the output member of the prime mover means in the second direction to disconnect the clutch means to thereby enable the urging means to return the optical means to the first position. The urging means may include a spring. The reset mechanism may further include drive means which is responsive to the movement of the output member of the prime mover means in the second direction to drive the retracting mechanism to reset the same. The clutch means may be arranged to be connected with the optical means at the time of resetting of the retracting mechanism by the drive means. The release means may be arranged to operate in advance to the drive means by the movement of the output member of the prime mover means. The prime mover means may include an electrical motor having an output shaft rotatable in a normal and a reverse direction. The view finder optical means may include a mirror member supported moveably between the first and the second position. The optical means may be supported to be laterally swingable relative to the optical path. The camera may further comprise image pickup means for producing an electrical image signal in response to a received light image. The pickup means may be arranged to receive the light image along the optical path when the optical means is moved to the second position by the retracting mechanism. The camera may further comprise recording means for recording the image signal produced by the pickup means.

According to another aspect of the present invention, there is provided a camera which comprises image pickup means, viewfinder optical means, shutter means, first means, second means, and third means. The image pickup means produces an electrical image signal in response to image light passing along an optical path. The view finder optical means is movable into and from the optical path. The shutter means exposes the pickup means to the image light. The first means temporarily retracts the optical means from the optical path. The second means opens the shutter means for a controlled period of time in synchronism with the retraction of the optical means by the first means. The third means maintains the optical means in the retracted condition and the shutter means in the opened condition.

In the camera of this embodiment the third means may include manually operable means for retracting the optical means from the optical path and for opening the shutter means, and releasable lock means for locking the operable means in an operated condition. The first means may include retracting means, charging means and motor means. The retracting means is driven by charged energy to retract the optical means from the optical path. The charging means charges the retracting means with the power. The motor means is coupled to drive the charging means. The first means may further include returning means responsive to the motor means to return the optical means to an original position in the optical path. The first means may further include latch means for latching the retracting means in the charged condition and release means for releasing the latching of the retracting means by the latch means. The release means may be arranged to respond to the motor means to release the latching. The motor means may have an output member alternatively rotatable in first and second directions. The release means and the charging means may be responsive to the rotation of the output member in the first and second directions, respectively. Also, the release means may include electromagnet means to release the latching. In this case, the camera may further comprise manually operable trigger means for energizing the electromagnet means to release the latching.

The camera may further comprise recording means for recording a predetermined image signal produced by the pickup means. The recording means may include a magnetic disc recording device.

In another embodiment, the camera may further comprise socket means for enabling an external device to be connected to receive the image signal produced by the image pickup means. In this case the third means may include detection means for detecting the connection of the external device to the socket means and retracting means responsive to the detection means to retract the optical means from the optical path when the external device is connected to the socket means. The camera may further comprise manually operable trigger means in which the third means may further include control means responsive to the detection means and to the trigger means for maintaining the shutter means in the opened condition so long as the trigger means is operated when the detection means detects the connection of the external device to the socket means.

According to yet another aspect of the present invention, there is provided a camera which comprises image pickup means, view finder optical means, shutter means, socket means, detection means, first means, and second means. The image pickup means produces an electrical image signal in response to an image light coming along an optical path. The viewfinder optical means is movable into and from the optical path. The shutter means exposes the pickup means to the image light. The socket means enables an external device to be connected to receive the image signal produced by the pickup means. The detection means detects the connection of the external device to the socket means. The first means is responsive to the detection means to retract the optical means from the optical path. The second means is responsive to the detection means to open the shutter means.

The camera of this embodiment may further comprise manually operable trigger means, in which the second means is further responsive to the trigger means to maintain the shutter means in the opened condition when the trigger means is operated while detection means detects the connection of the external device to the socket means. The camera may further comprise recording means for recording a predetermined image signal produced by the pickup means The recording means may include a magnetic disc recording device.

Thus, by the present invention, the retraction and the resetting of the viewfinder optical means relative to the optical path can be performed with utilizing the movement of the output member of the prime mover means in the first and the second direction, respectively; and therefore, the mechanism for operating the optical means, and hence the camera mechanism, can be made simple and compact and reliable operation of the optical means can be assured.

In addition, with the present invention, it becomes possible to utilize the still video type camera as an usual motion video camera by adding a simple mechanical structure.

Furthermore, the present invention makes it possible to set the still video type camera in a motion video mode by a simple operation of connecting an external device to the socket means.

These and other aspects, features and advantages of the present invention will become clear from the following detailed explanation of the preferred embodiments referring to the accompanied drawings.

BRIEF DESCRIPTION OF THE DRAWINGS

FIG. 1 shows an electrical circuit system of a still video camera;

FIG. 26 shows a control flow performed by a control circuit in FIG. 25.

DETAILED DESCRIPTION OF THE PREFERRED EMBODIMENTS

A first embodiment of the present invention will be explained herein below with reference to FIGS. 2A to 4B.

Figure 2A:
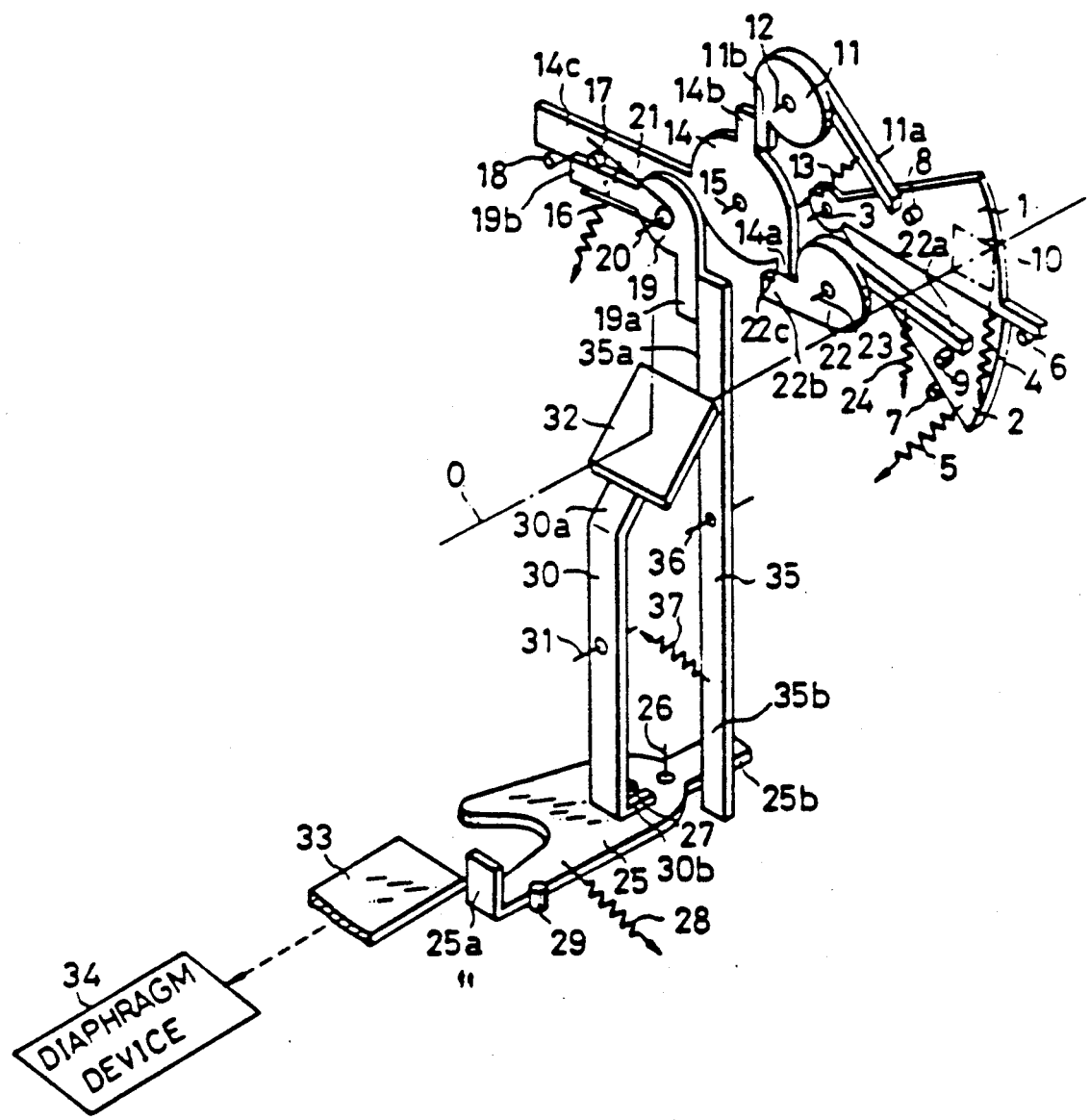
FIGS. 2A and 2B show a camera exposure mechanism of a first embodiment of the present invention in a rest condition and in a preparatory exposure condition, respectively.
Figure 2B:
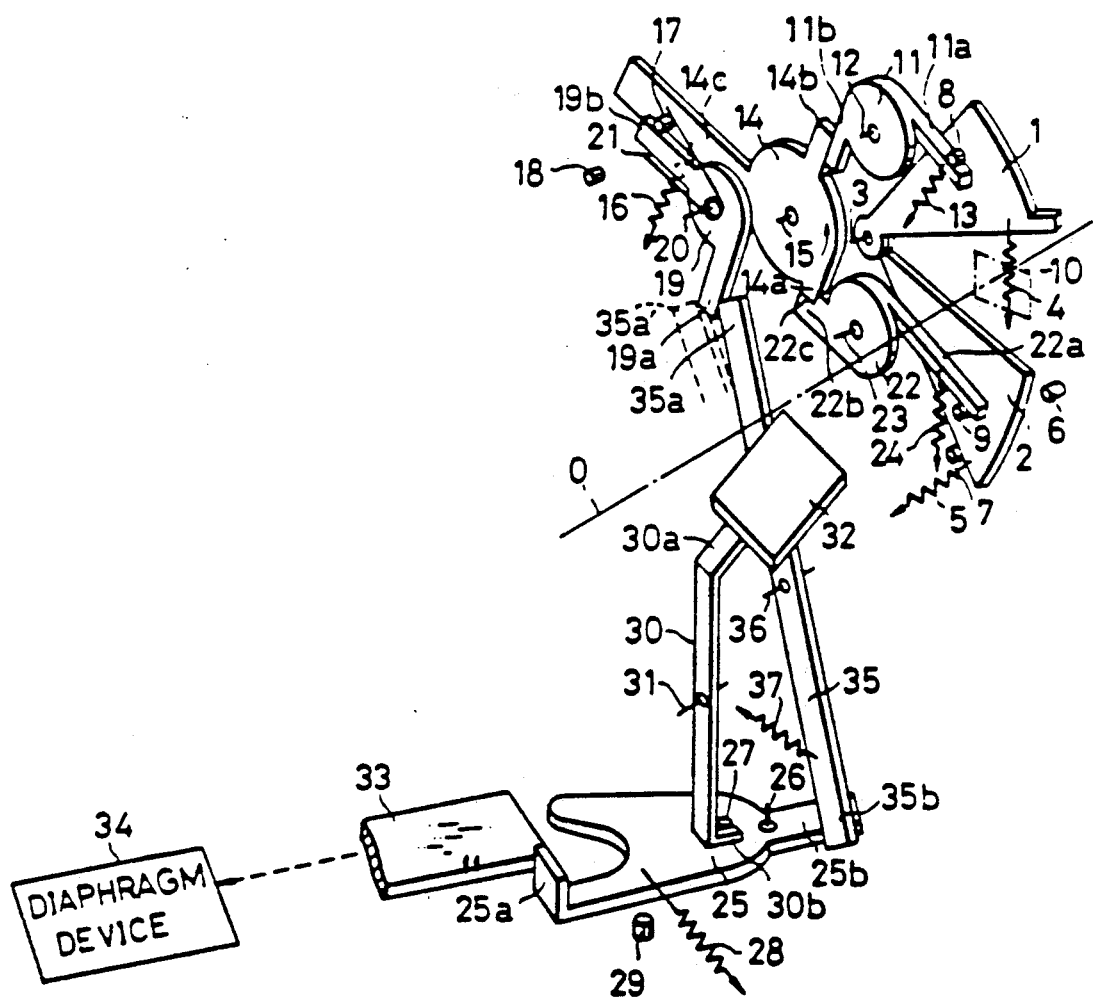

In the camera mechanism shown in FIGS. 2A and 2B, there are provided a pair of shutter blades 1 and 2. These shutter blades 1 and 2 are pivotally mounted at a common axis 3 and are respectively urged by springs 4 and 5 in a clockwise direction. Stopper pins 6 and 7 are respectively provided for the shutter blades 1 and 2 to limit their clockwise movement. The blades 1 and 2 are provided with pins 8 and 9 mounted thereon, respectively. The first shutter blade 1, when it is rotated in the clockwise direction by the spring 4 until it strikes on the stopper pin 6, closes a picture taking aperture 10; and when it is rotated in the counterclockwise direction against the spring 4, it opens the aperture 10. The second shutter blade 2, when it is rotated in the clockwise direction by the spring 5 until it is restricted by the stopper pin 7, opens the aperture 10; and when it is rotated in the counterclockwise direction against the spring 5, it closes the aperture 10.

A shutter blade latch member 11 is pivotally mounted at an axis 12 and is urged by a spring 13 in a clockwise direction so that its arm part 11b strikes on an arm part 14b of a drive member 14. The latch member 11 is also provided with an arm part 11a to latch the first shutter blade 1 at its pin 8 after the first shutter blade has been rotated in the counterclockwise direction to open the aperture 10.

The drive member 14 is pivotally mounted at an axis 15 and is urged by a spring 16 in a counterclockwise direction so that its arm part 14c strikes on a stopper pin 18. The member 14 is provided with three arm parts 14a, 14b and 14c; and the arm part 14c is provided with a pin 17 mounted thereon.

A trigger member 19 is pivotally mounted at an axis 20 and is urged by a spring 21 to be hauled relative to the drive member 14 so that its arm part 19b strikes the pin 17 on the arm part 14c of the drive member 14. The trigger member 19 is provided with two arm parts 19a and 19b.

A lock member 22 is pivotally mounted at an axis 23 and is urged by a spring 24 in a clockwise direction. The lock member 22 is provided with two arm parts 22a and 22b. The arm part 22a is engageable with the pin 9 on the second blade 2; and the arm part 22b is provided with a step part 22c which is engageable with the tip of the arm part 14a of the drive member 14.

A viewfinder mirror operating lever 25 is pivotally mounted at an axis 26 and is urged by a spring 28 in a counterclockwise direction so that it strikes on a stopper pin 29. The operating lever 25 is provided with a bent up part 25a and a tail part 25b. A pin 27 is mounted on the operating lever 25.

A view finder mirror supporting lever 20 is pivotally mounted at an axis 31 and supports a viewfinder mirror 32 at an inclined end part 30a so that the mirror 32 is held in a predetermined inclined condition with respect to a picture taking optical axis O. The supporting lever 30 has a fork part 30b at its lower end which engages with the pin 27 on the operating lever 25. The mirror 32 is held at a predetermined viewing position in the optical path when the operating lever 25 is pivoted by the spring 28 in the counterclockwise direction until it is restricted by the stopper pin 29.

A diaphragm stop down lever 33 is arranged to be pushed by the bent up part 25a of the mirror operating lever 25 to stop down a diaphragm device 34 having a known construction.

A link lever 35 is pivotally mounted on an axis 36 and is urged by a spring 37 in a counterclockwise direction. The link lever 35 is engaged with the arm part 19a of the trigger member 19 and with the arm part 25b of the mirror operating lever 25 at its fore and tail end parts 35a and 35b respectively.

Figure 3:
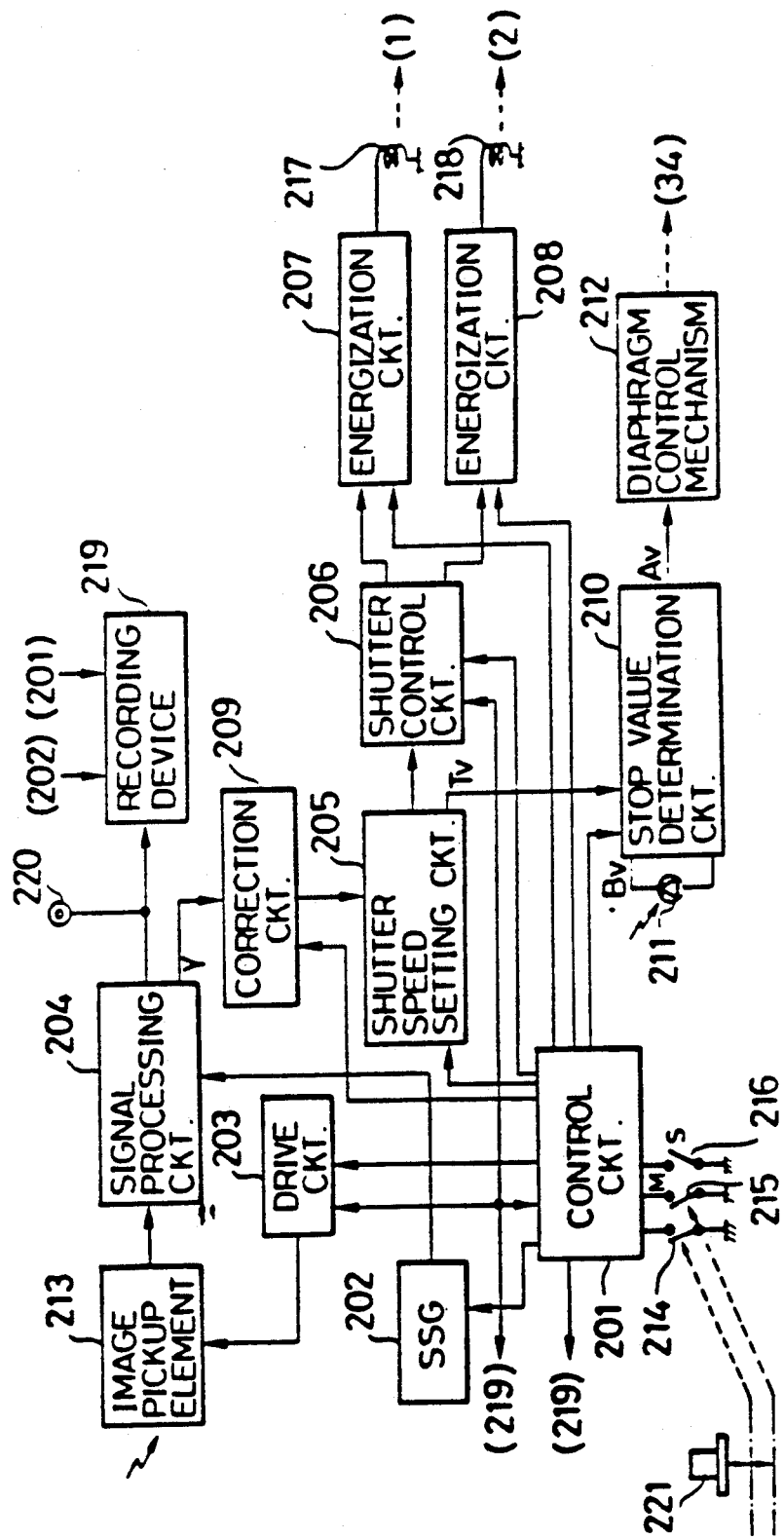
FIG. 3 is a block diagram of an electrical circuit system used with the camera exposure mechanism of FIGS. 2A and 2B.

Next, in the block diagram of FIG. 3, a synchronization signal generation circuit 202 (SSG hereinafter) is provided for generating synchronization signals. A drive circuit 203 is connected to drive an image pickup element 213 in response to the synchronization signal supplied by the SSG circuit 202. The image pickup element 213 is arranged to receive image light through the camera aperture when the mirror 32 (FIGS. 2A and 2B) is retracted from the optical path and the shutter is opened. A signal processing circuit 204, of a known construction, is connected to receive and process the output signal of the image pickup element 213. A video floppy disc recording device 219 of known construction is connected to receive and record the output signal of the processing circuit 204. An external output terminal 220 is also connected to the output of the signal processing circuit 204.

A shutter speed setting circuit 205 is provided for setting a desired shutter speed. A shutter control circuit 206 of a known construction is connected to control the deenergization of electromagnets 217 and 218 in response to the output signal of the shutter speed setting circuit 205 and the synchronization signal supplied from the SSG 202. Energization circuits 207 and 208 are respectively arranged to energize the electromagnets 217 and 218 in response to the control signal supplied from a control circuit 201 and deenergize the electromagnets 217 and 218 in response to the control signal supplied from the shutter control circuit 206. The electromagnets 217 and 218 are arranged to move the shutter blades 1 and 2 (FIGS. 2A and 2B) against the springs 4 and 5, respectively when they are energized by the energization circuits 207 and 208, respectively.

A correction circuit 209 is connected to supply a shutter speed correction signal to the shutter speed setting circuit 205 based on a luminous signal Y supplied by the signal processing circuit 204. A stop valve determination circuit 210 of known construction is connected to receive a shutter speed signal Tv supplied from the shutter speed setting circuit 205 and an object brightness signal Bv supplied by an object brightness measuring element (photocell) 211. The measuring element 211 may be positioned to receive object light through the diaphragm device 34 (FIGS. 2A and 2B) but not through the view finder mirror 32. A diaphragm control mechanism 212 is connected to control the diaphragm device 34 in response to a stop value signal Av supplied by the determination circuit 210.

The control circuit 201 is programmed to control the entire circuit system based on the conditions of switches 214, 215 and 216. The first and second trigger switches 214 and 215 are respectively of normally open type and are arranged to be closed by a first and a second step of the depression of a trigger button 221, respectively. The mode select switch 216 is arranged to be manually operable to designate a still video mode and a motion video mode by its opened and closed condition, respectively. The control circuit 201, which may comprise a microcomputer, has a control function shown by the flow charts of FIGS. 4A and 4B.

Next, the operation of this embodiment will be explained with reference to FIGS. 2A to 4B.

Operation in the still video mode will be explained first. The control circuit 201 operates the system in the still video mode when the mode select switch 216 is opened (i.e. moved to the S terminal) and the control function of the control circuit 201 is in the still video mode as shown in FIG. 4A.

Figure 4A:
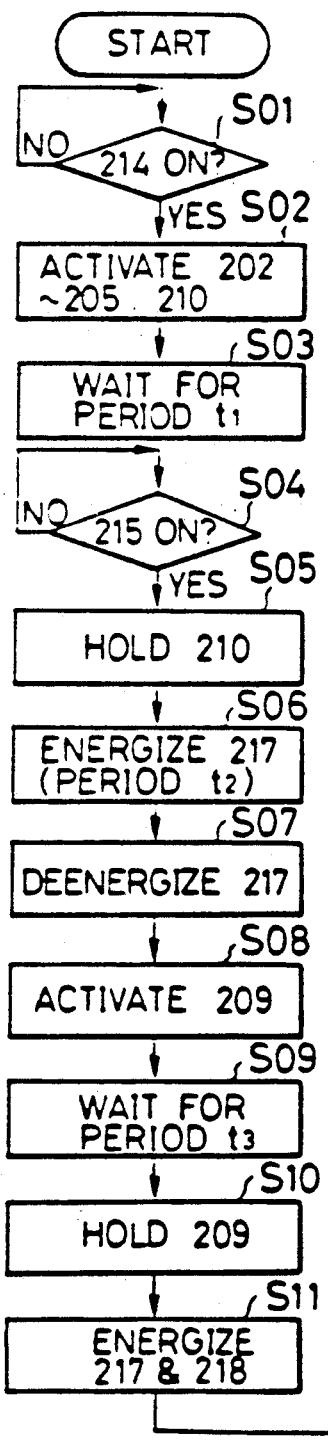
FIGS. 4A and 4B are flow control program diagrams showing control flows performed by the control circuit of FIG. 3 in a still video and in a motion video mode, respectively.

In the condition shown in FIG. 2A, the control circuit 201 checks the first trigger switch 214 to ascertain whether it is closed by the depression of the trigger button 221 to the extent of the first step (step S01 in FIG. 4A). If the switch 214 is found to be closed, the control circuit 201 causes the circuits 202, 203, 204, 205 and 210 to operate (step S02 in FIG. 4A). Thus, the SSG circuit 202 begins to generate the synchronization signals and the drive circuit 203 also begins to drive the pickup element 213 based on the supplied synchronization signals. The output signal of the pickup element 213 is processed in the processing circuit 204 based on the synchronization signals supplied from the SSG circuit 202. On the other hand, the stop valve determination circuit 210 determines the appropriate stop value based on the object brightness signal Bv supplied by the brightness measuring element 211 and the shutter speed signal Tv supplied by the shutter speed setting circuit 205 in accordance with the preset shutter speed set by the circuit 205, and produces the stop valve signal Av corresponding to the determined stop value. In response to the stop value signal Av, the diaphragm control mechanism 212 controls a preset means of the diaphragm device 34 in accordance with the stop valve represented by the signal Av. Thus, the stop value determined by the determination circuit 210 is preset to the diaphragm device 34.

The control circuit 201 waits for a time period of $t_1$ (step S03 in FIG. 4A), which is sufficient for the completion of the above explained stop value determination and presetting operation; and then checks the second trigger switch 215 to ascertain whether it has been closed, by the depression of the trigger button 221, to the extent of the second step (step S04 in FIG. 4A). If the switch 215 is found to be closed, the control circuit 201 causes the stop value determination circuit 210 to hold the determined stop value (step S05 in FIG. 4A). Then the control circuit 201 commands the energization circuit 207 to energize the electromagnet 217 for the first shutter blade 1 for a time period of $t_2$ (step S06 in FIG. 4A). Thus, the first shutter blade 1 is rotated in the counterclockwise direction against the spring 4 by the magnetic force of the electromagnet 217. Then, the mirror operating lever 25 is rotated in the clockwise direction by a mirror retracting mechanism against the spring 28. Preferred mirror retracting mechanisms are shown in FIGS. 14, 18, 19, 22, 24A and 24B. By this, the mirror supporting lever 30 is rotated in the counterclockwise direction to retract the viewfinder mirror 32 from the optical path. At the same time, the stop down lever 33 is pressed by the bent up part 25a of the operating lever 25 and stops down the diaphragm device 34 to the stop value determined by the stop value determination circuit 210 and preset by the central mechanism 212. On the other hand, the link lever 35 is rotated in the counterclockwise direction against the spring 37 by the clockwise rotation of the mirror operating lever 25; and causes the trigger member 19 to rotate in the clockwise direction together with the drive member 14 against the spring 16. Thus, the drive member 14 causes, through its arm part 14b, the latch member 11 to rotate in the counterclockwise direction against the spring 13 and to latch, through its arm art 11a, the first shutter blade 1 at the pin 8 thereon to hold the first shutter blade in its upper or opened condition. The drive member 14 is locked by the step part 22c of the lock member 22 at its arm part 14a in the rotated condition. The above explained operated condition is shown in FIG. 2B. Here, in this case, the fore end part 35a of the link lever 35 is moved to the left side of the arm part 19a of the trigger member 19 by overshooting the same as is shown by the dotted line 35a in FIG. 2B.

When the time period of $t_2$ has elapsed, the control circuit 201 commands the energization circuit 207 to deenergize the electromagnet 217 (step S07 in FIG. 4A). The time period of $t_2$ is selected to be sufficient for the first shutter blade 1 to be rotated in the counterclockwise direction and latched by the latch member 11. Thus, the aperture 10 is kept opened; and, in this condition, the control circuit 201 causes the correction circuit 209 to operate (step S08 in FIG. 4A). The correction circuit 209 detects the luminosity of the object scene based on the luminous signal Y supplied by the signal processing circuit 204 and produces the shutter speed correction signal. In response to this correction signal, the shutter speed setting circuit 205 corrects the set shutter speed and provides a corrected shutter speed signal to the shutter control circuit 206. After the step S08, the control circuit 201 waits for a time period of $t_3$ (step S09 in FIG. 4A), which is sufficient for the completion of the above explained shutter speed correction operation; and then causes the correction circuit 209 to hold the correction signal (step S10 in FIG. 4A).

The control circuit 201 thereupon commands the energization circuits 207 and 208 to energize the electromagnets 217 and 218 (step S11 in FIG. 4A). When the electromagnet 218 is energized, the second shutter blade 2 is rotated in counterclockwise direction against the spring 5 by the magnetic force of the electromagnet 210 and closes the aperture 10. At this time, the pin 9 on the second shutter blade 2 presses the lock member 22 at its arm part 22a and rotates the lock member 22 in the counterclockwise direction against the spring 24. Thus, the lock member 22 releases the locking of the drive member 14; and accordingly, the drive member 14 is rotated in the counterclockwise direction by the spring 16 together with the trigger member 19 until the drive member 14 is restricted by the stopper pin 18. By the counterclockwise rotation of the drive member 14, the latch member 11 is freed from pressing by the arm part 14b of the drive member 14 and rotates in the clockwise direction by the spring 13 to release the latching of the first blade 1 at its pin 8 through the arm part 11a thereof. The first blade 1 is thereupon kept at the counterclockwisely rotated condition by the electromagnet 217.

The control circuit 201 then triggers the shutter control circuit 206 (step S12 in FIG. 4A). When triggered, the shutter control circuit 206 causes, in response to the vertical synchronization signal supplied by the SSG circuit 202 right after the triggering, the energization circuit 208 to deenergize the electromagnet 218. Then, after the time lag corresponding to the shutter speed (exposure time) indicated by the corrected shutter speed signal supplied by the shutter speed setting circuit 205, the shutter control circuit 206 causes the energization circuit 207 to deenergize the electromagnet 217. Thus, the second and the first shutter blades 2 and 1 are respectively rotated in the clockwise direction in the named order by the springs 5 and 4 at points in time separated by the above mentioned time lag. By this, the image pickup element 213 is exposed to the object light for a time period corresponding to the time lag. The image signal generated in the pickup element 213 in response to the light exposure is read out and supplied to the recording device 219 after being processed by the signal processing circuit 204 during a field period immediately following the field period during which the exposure of the pickup element 213 has been made. Therefore, before the commencement of the reading out of the image signal from the pickup element 213 after the exposure thereof, the control circuit 201 triggers the recording device 219 (step S13 in FIG. 4A); and by this, the recording device 219 records on the floppy disc the image signal supplied by the processing circuit 204 and corresponding to one TV field, based on the synchronization signal supplied by the SSG circuit 202.

After the completion of the exposure of the pickup element 213, the operating lever 25 is freed from the latching by the mirror retracting mechanism, e.g. as shown in FIGS. 14, 18, 19, 22, 24A and 24B, and therefore, the operating lever is rotated in the counterclockwise direction by the spring 28 until it is restricted by the stopper pin 29. Thus, the supporting lever 30 is rotated in the counterclockwise direction to return the view finder mirror 32 to the viewing position in the optical path. At the same time, the link lever 35 follows the operating lever 25 and is rotated in the clockwise direction by the spring 37, thus allowing the trigger member 19 to rotate in the counterclockwise direction against the spring 21. As a result the fore end part 35a is returned to the right side of the arm part 19a of the trigger member 19. Furthermore, the stop down lever 33 also follows the operating lever 25 to return the diaphragm device 34 to the initial fully opened mechanism is returned to that condition. Thus, the mechanism is returned to that condition shown in FIG. 2A. On the other hand, on completion of signal recording by the recording device 219, the control circuit 201 checks the switch 214 to ascertain whether it is open (step S14 in FIG. 4A); and if the switch 214 is found to be open, the control circuit 201 deactivates the circuits 202, 203, 204, 205, 209 and 210 (step S15 in FIG. 4A). This is the end of operation in the still video mode.

The operation of the apparatus in the motion video mode will now be explained. The control circuit 201 operates the system in the motion video mode when the mode select switch 216 is closed (i.e. moved to its M terminal) and its control function in the motion video mode is shown in FIG. 4B.

In the condition shown in FIG. 2A, the control circuit 201 checks the first trigger switch 214 to ascertain whether it is closed (step S21 in FIG. 4B); and if it is found to be closed, the control circuit 201 causes the shutter speed setting circuit 205 to set the shutter speed (exposure time) (Tv) at 1/60 sec. (step S22 in FIG. 4B) and then activates the circuits 202, 203, 204 and 210 (step S23 in FIG. 4B). After the step S23, the control circuit 201 checks the second trigger switch 215 to ascertain whether it is closed (step S24 in FIG. 4B); and if it is found to be closed, the control circuit 201 commands the energization circuit 207 to energize the electromagnet 217 for the time period $t_2$ (step S25 in FIG. 4B). Thus, the first shutter blade 1 is rotated counterclockwise to open the aperture 10. Within the above time period $t_2$, the mirror retracting mechanism operates on the operating lever 25 to retract the mirror 32 from the optical path. By this operation, the first shutter blade I is latched at its aperture opening position by the latch member II which, in turn, is locked by the lock member 22 through the drive member 14, as is shown in FIG. 2B. Moreover, the diaphragm device 34 is stopped down by the stop down lever 33 to the stop down value determined by the stop value determination circuit 210. In this case, the stop value determination circuit 210 determines or controls the stop value (Av) based on the brightness signal Bv supplied by the measuring element 211 which receives the object light through the stopped down diaphragm device and the shutter speed signal Tv representing an exposure time of 1/60 sec. which corresponds to the TV field rate under NTSC system. (Therefore, under PAL system, an exposure time of 1/50 sec. may be preferable.). In accordance with the stop value signal Av produced by the determination circuit 210, the diaphragm control mechanism 212 controls the diaphragm device 34 to adjust the diaphragm aperture thereof. When the time period $t_2$ has elapsed, the control circuit 201 commands the energization circuit 207 to deenergize the electromagnet 217 (step S26 in FIG. 4B). Accordingly, the first blade 1 is held at its aperture opening position by the latch member 11.

Thus, in the motion video (movie) mode, the signal processing circuit 204 produces successive video signals corresponding to the motion picture and these signals can be taken out through the external terminal 220. Therefore, it is possible to record the signals on tape by connecting a VCR (Video Cassette Recorder) to receive the signals from the terminal 220. Also, it is possible to monitor the image by using an electronic viewfinder connected to receive the signals from the terminal 2.

Figure 4B:
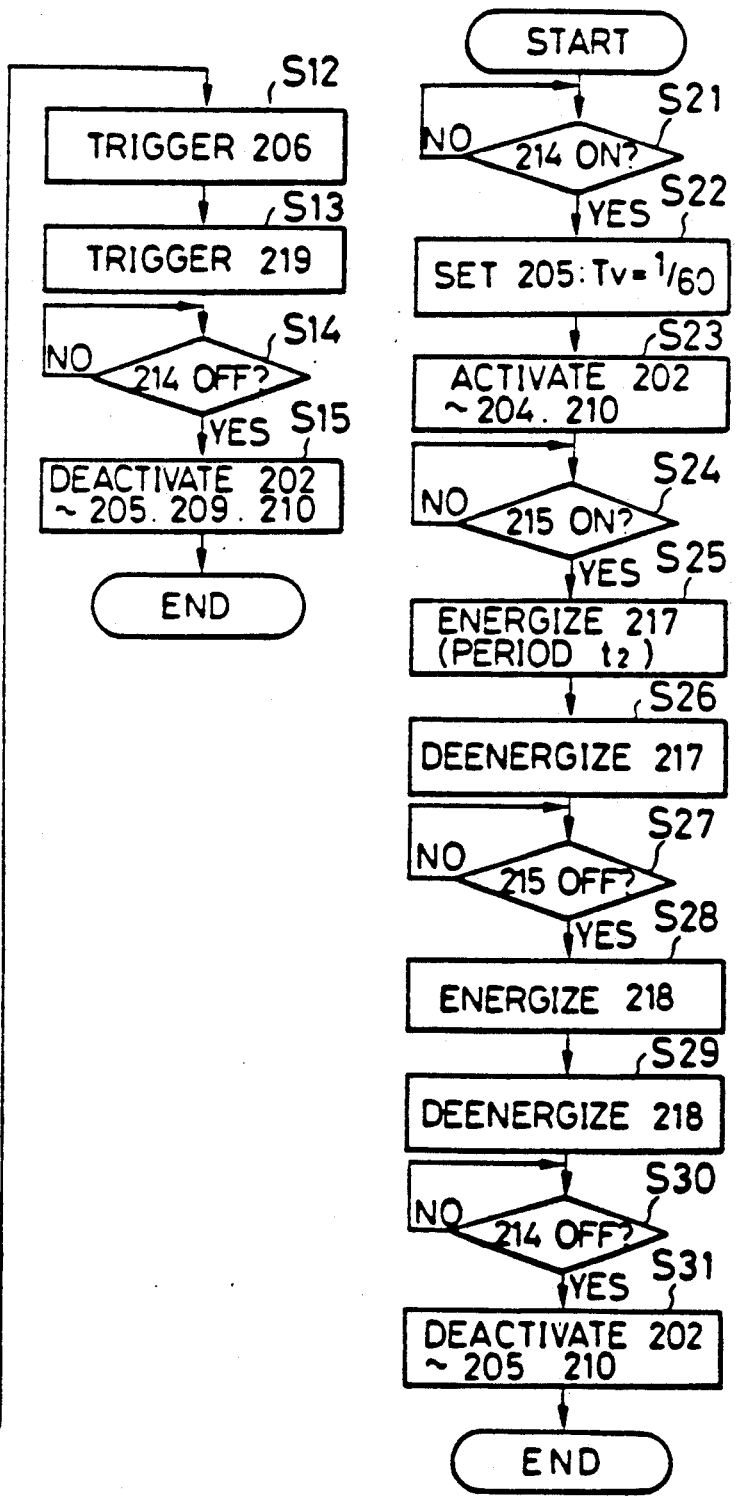

During operation, the control circuit 201 repeatedly checks the switch 215 to ascertain whether it is open (step S27 in FIG. 4B) and when it is found to be open, the control circuit 201 commands the energization circuit 208 to energize the electromagnet 218 (step S28 in FIG. 4B). Thus, the second blade 2 is rotated in the counterclockwise direction to close the aperture 10 and to release the locking of the drive member 14 and hence the latch member 11 by the lock member 22. The control circuit 251 then commands the energization circuit 208 to deenergize the electromagnet 218 (step S219 in FIG. 4B). Thus, the first and second blades 1 and 2 are returned in a clockwise direction to their respective rest positions by the springs 4 and 5, respectively. The viewfinder mirror 32 is then returned to its viewing position and the mechanism is returned to the condition shown in FIG. 2A.

After the step S29, the control circuit 201 checks the switch 214 to ascertain whether it is open (step S30 in FIG. 4B); and if it is found to be open, the control circuit 201 deactivates the circuits 202 to 205 and 210 and ceases the operation (step S31 in FIG. 4B).

Figure 5:
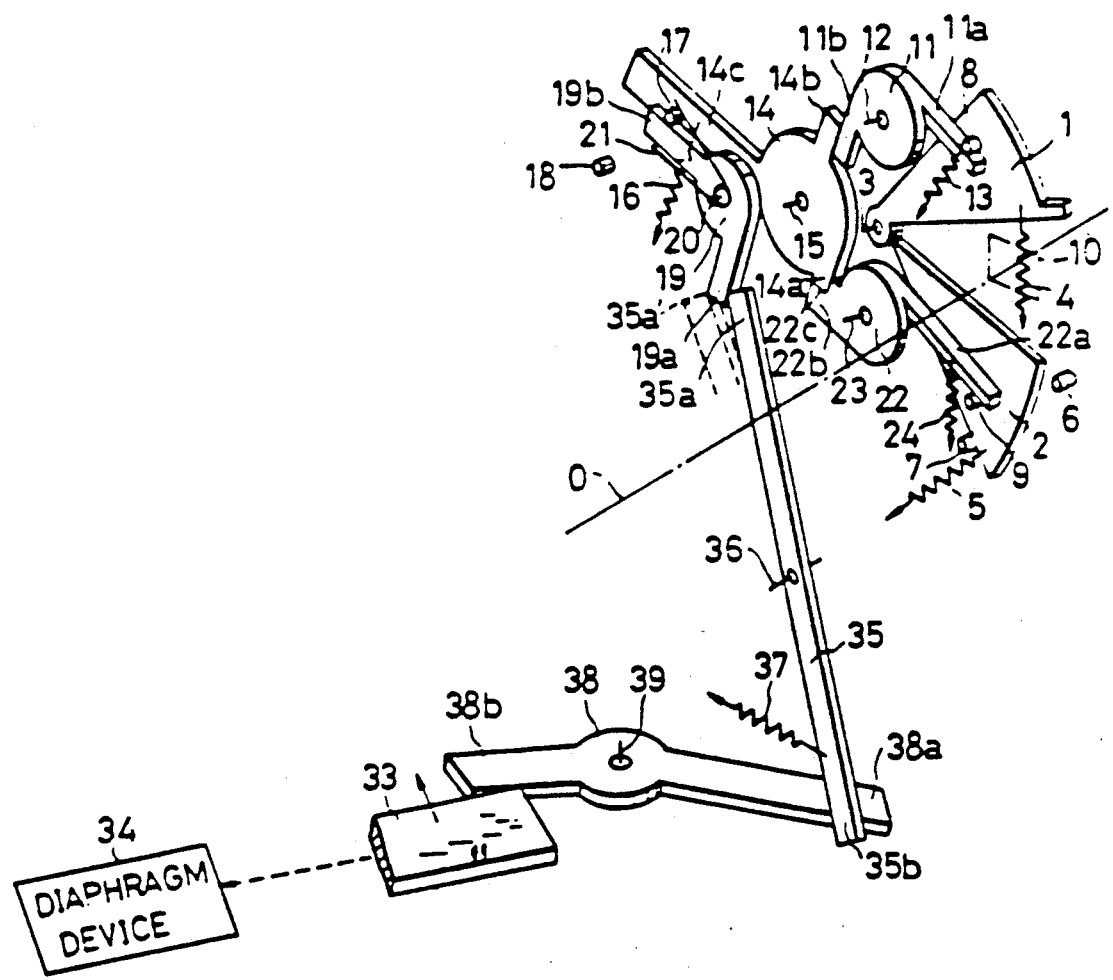
FIG. 5 shows a modification of the camera exposure mechanism of FIGS. 2A and 2B.

A modification of the above explained first embodiment, is shown in FIG. 5. Here the link lever 35 may be arranged to be driven in the counterclockwise direction by the stop down operation of the stop down lever 33 acting through a connecting lever 38 which is pivotally mounted at an axis 39. The connecting lever 38 has a fore end part 38b which is engaged by the stop down lever 33, and a tail end part 38a which engages a tail end part 35b of the link lever 35.

Figure 6A:
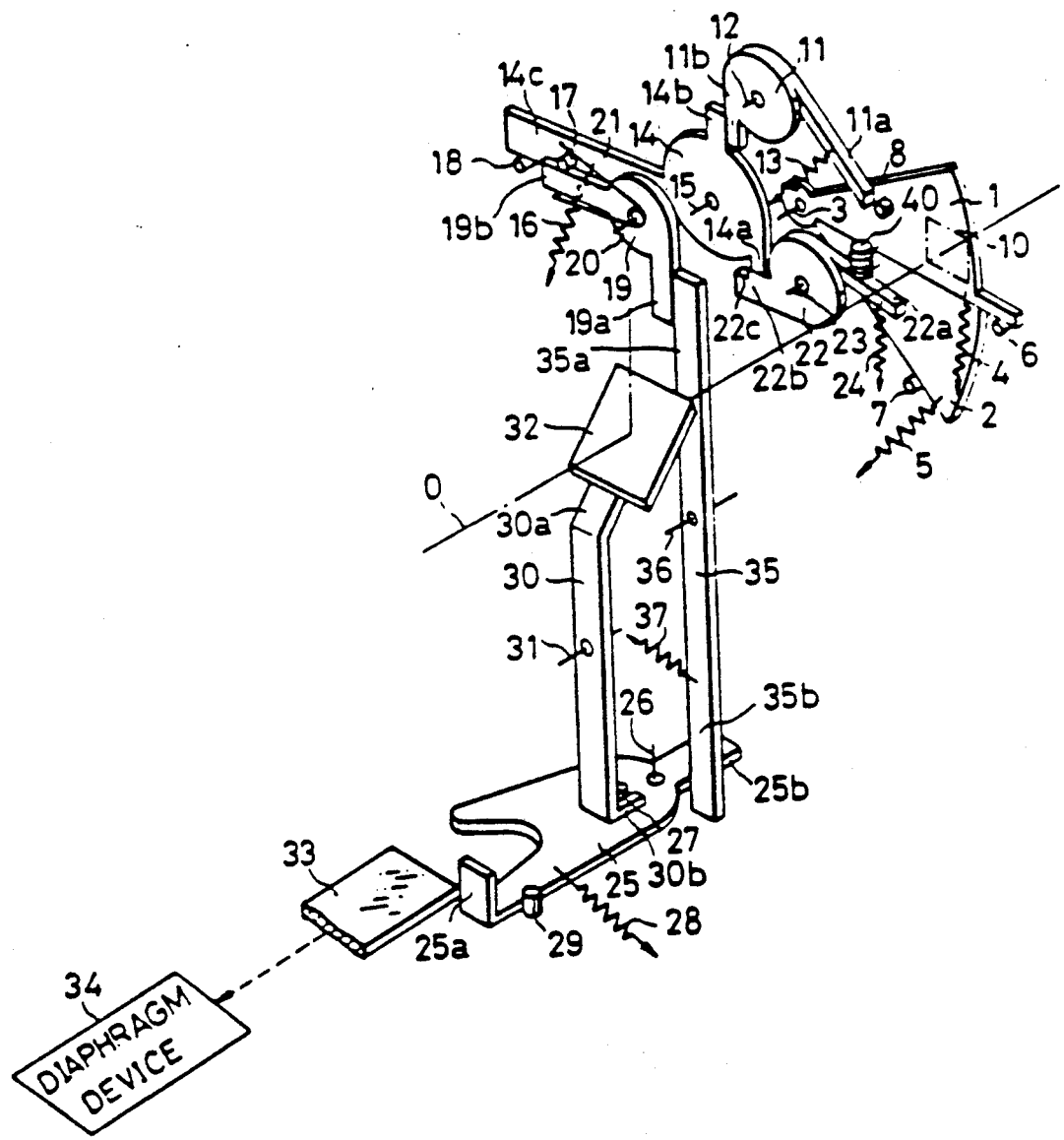
FIGS. 6A and 6B show a camera exposure mechanism of a second embodiment of the present invention in a rest condition and in a preparatory exposure condition, respectively.
Figure 6B:
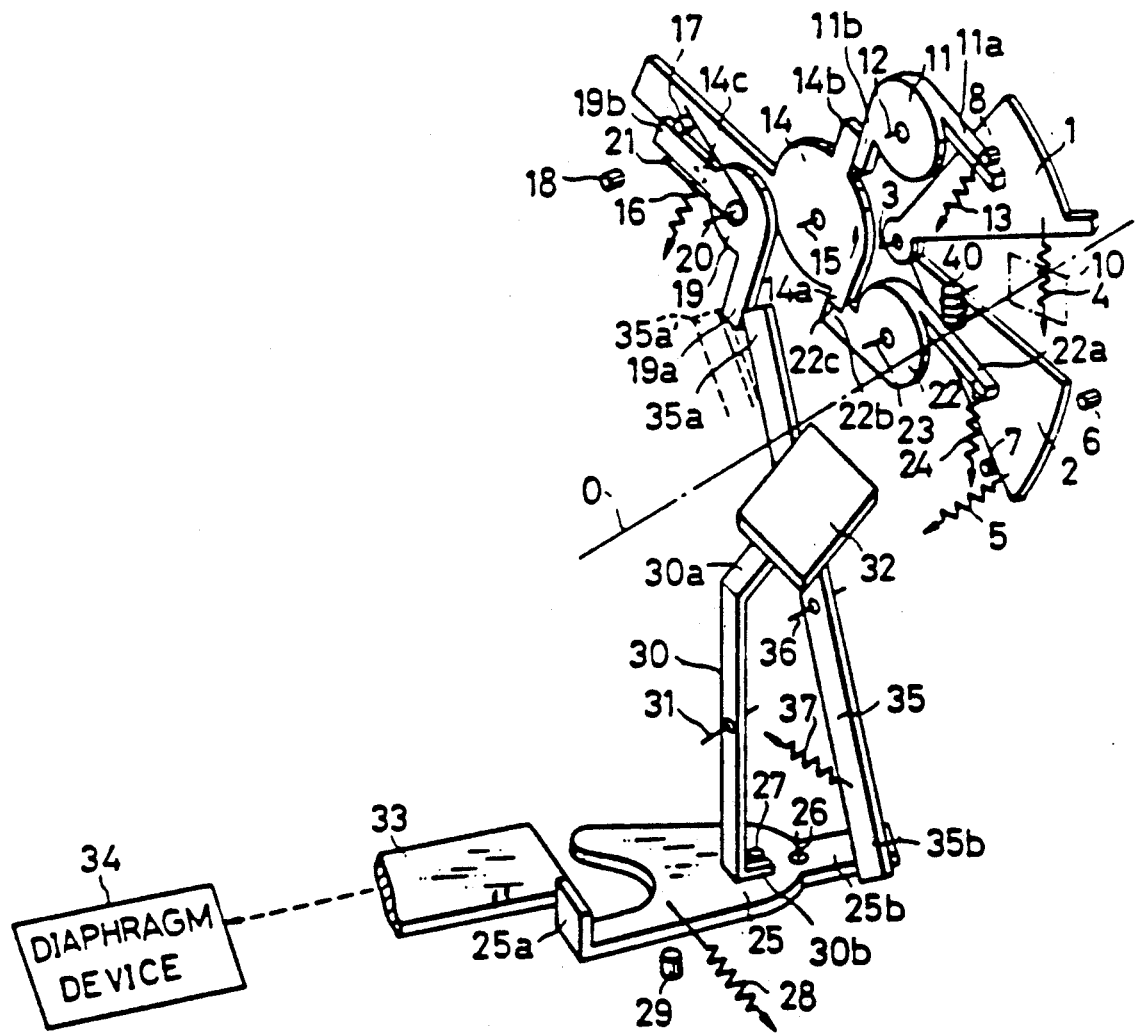
Figure 7:
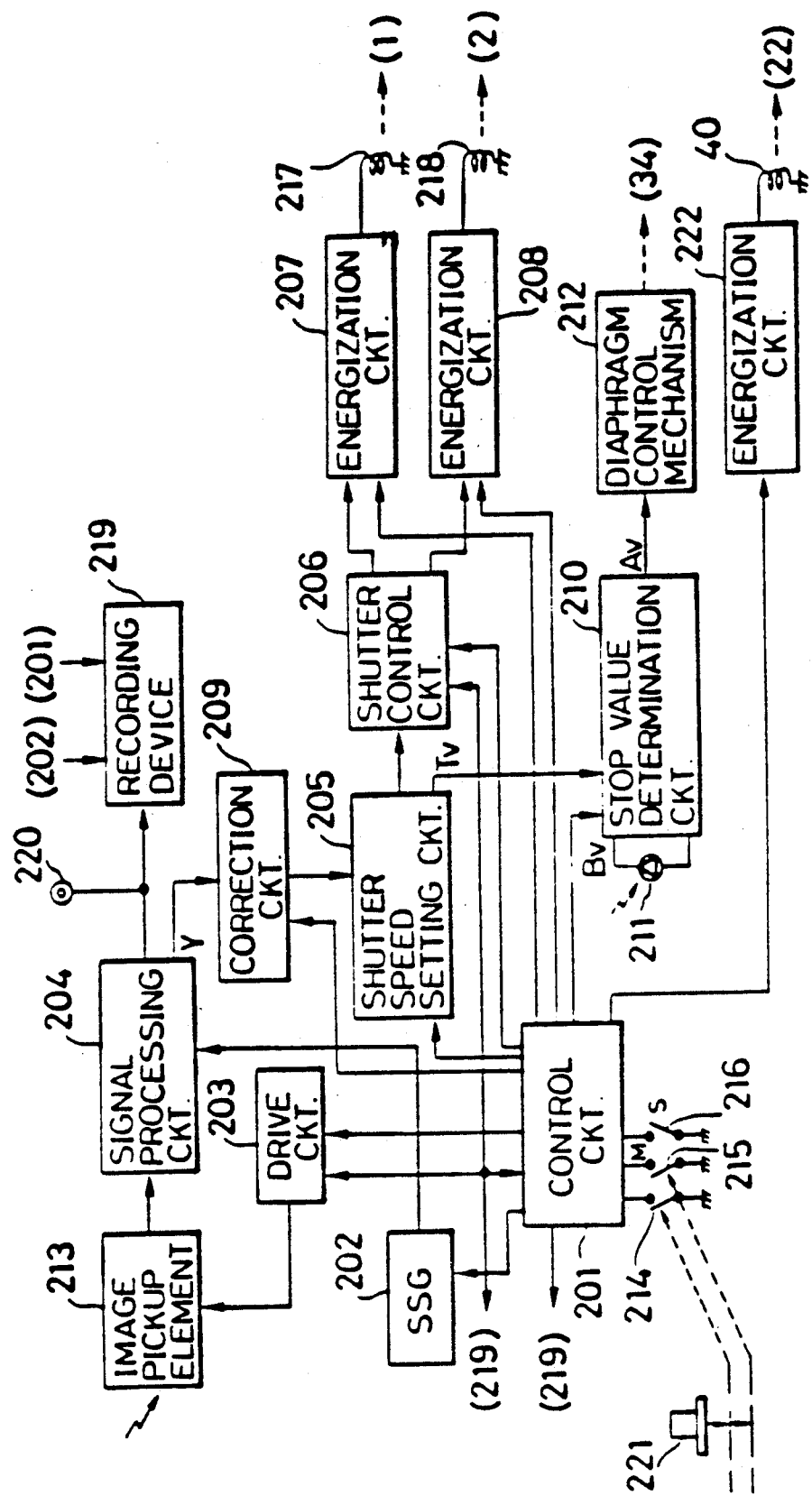
FIG. 7 is a block diagram of an electrical circuit system used with the camera exposure mechanism of FIGS. 6A and 6B.

A second embodiment of the present invention will be explained with reference to FIGS. 6A to 8B. The second embodiment differs from the first embodiment only in the manner of releasing of the latching of the first shutter blade 1 at its moved position by the latch member 11. That is, in the second embodiment, the locking of the drive member 14 by the lock member 22 is released by an electromagnet 40 which is positioned to act upon the arm part 22a of the lock number 22. The electromagnet 40 is arranged to attract the arm part 22a of the lock member 22 as is shown in FIGS. 6A and 6B. As is shown in FIG. 7, the circuit system further comprises an energization circuit 222 connected to energize and deenergize the electromagnet 40 under the control of the control circuit 201. The control circuit 201 has control functions for the still and the motion video mode shown in FIGS. 8A and 8B, respectively.

Figure 8A:
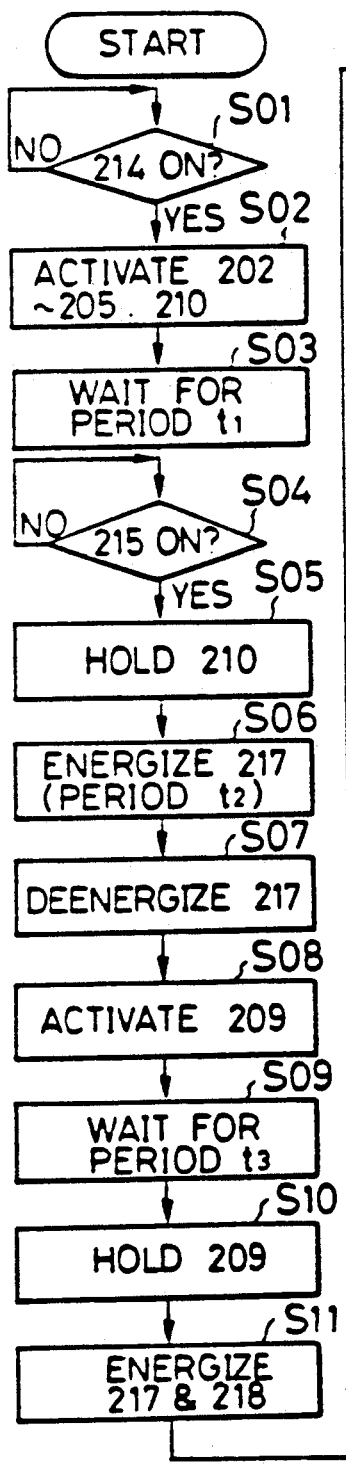
FIGS. 8A and 8B are flow control program diagrams showing control flows performed by the control circuit of FIG. 7 in a still video and in a motion video mode, respectively.

In the still video mode, as is shown in FIG. 8A, the control circuit 201 commands the energization circuit 222 to energize the electromagnet 40 (step 16) after the step S11. Thus, the electromagnet 40 attracts the arm part 22a of the lock member 22 and thereby causes the lock member 22 to rotate in the counterclockwise direction against the spring 24. Accordingly, the drive member 14 is unlocked and is rotated in the counterclockwise direction by the spring 16. Thus, the latch member 11 is rotated in the clockwise direction by the spring and thereby unlatches the first blade 1.

After the step S16, the control circuit 201 commands the energization circuit 222 to deenergize the electromagnet 40 (step S17 in FIG. 8A) and then goes to the step S12 to trigger the shutter control circuit 206.

Figure 8B:
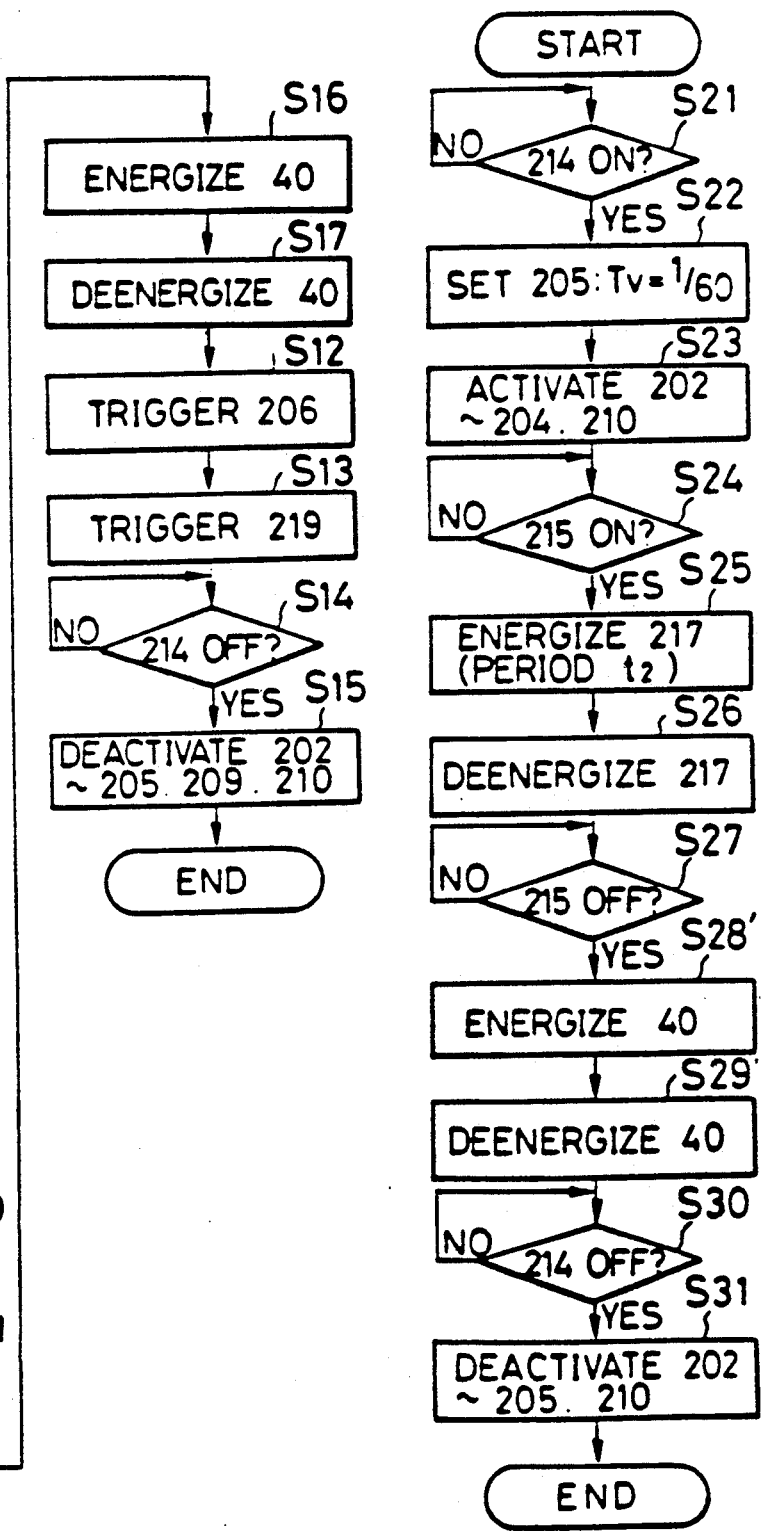

In the motion video mode, as is shown in FIG. 8B, the control circuit 201 commands the energization circuit 222 to energize the electromagnet 40 (step S28') after the step 27 (instead of the step S28 in FIG. 4B); and then the control circuit commands the circuit 222 to deenergize the electromagnet 40 (step S29') (instead of the step S29 in FIG. 4B). Thus, the latching of the first blade 1 is released by the electromagnet 40 and the blade 1 returns to its rest position. The control circuit 201 then goes to the step S30.

Other than the above, the construction and the manner of the operation of the second embodiment are the same as those of the first embodiment.

Figure 9:
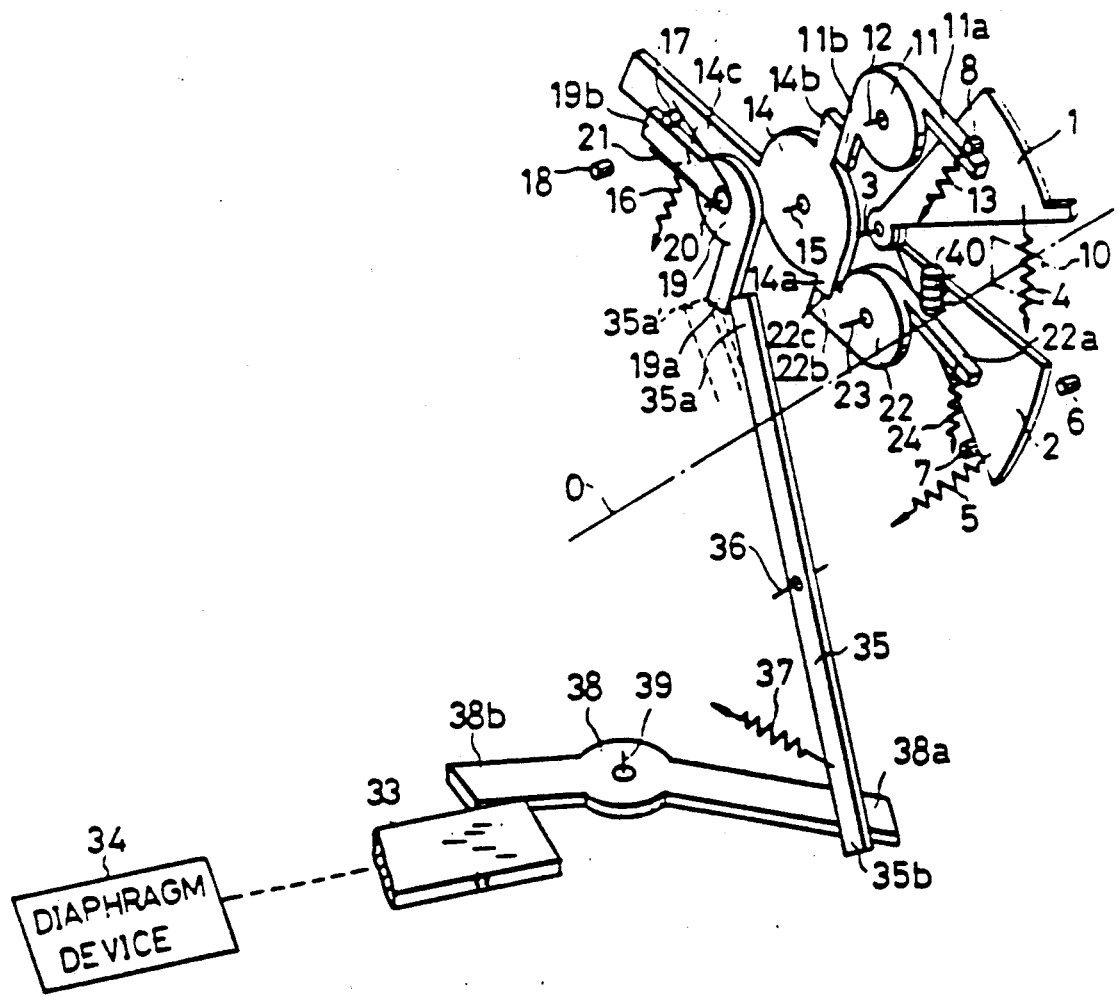
FIG. 9 shows a modification of the camera exposure mechanism of the FIGS. 6A and 6B.

Furthermore, as is shown in FIG. 9, the same modification as that shown in FIG. 5 with respect to the first embodiment may be made with respect to the second embodiment.

A third embodiment of the present invention will now be explained with reference to FIGS. 10A and 10B.

Figure 10A:
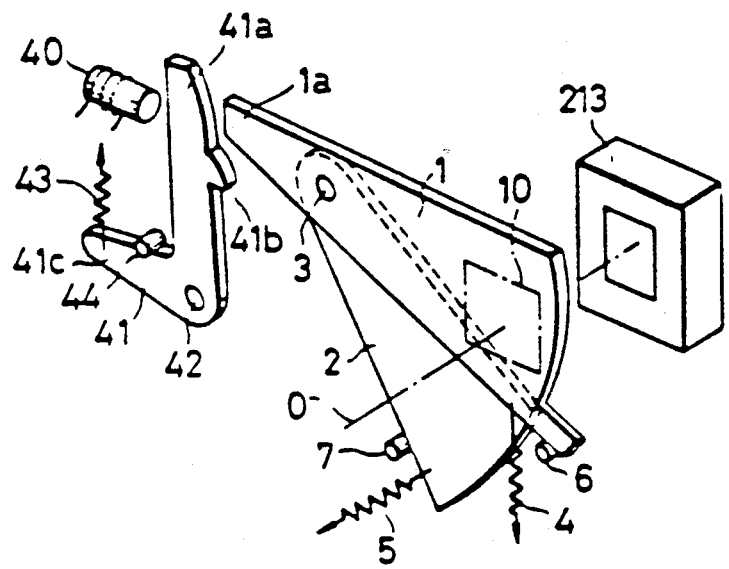
FIGS. 10A and 10B show a camera exposure mechanism of a third embodiment of the present invention in a rest condition and in a preparatory exposure condition, respectively.
Figure 10B:
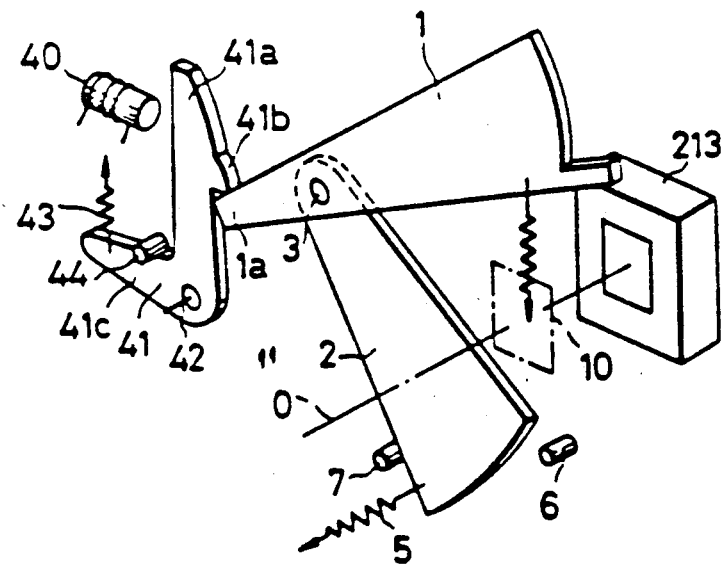

As shown in FIGS. 10A and 10B, a latch lever 41 is pivotally mounted at an axis 42 and is urged by a spring 43 in a clockwise direction so that its arm part 41c strikes on a stopper pin 44. The latch lever 41 is provided with a claw part 41b on another arm part 41a thereof to arrest the first shutter blade 1 at its tail end part 1a when the blade 1 is rotated to open the aperture 10. An electromagnet 40' (similar to the electromagnet 40 in the second embodiment) is arranged to attract the arm part 41a of the latch lever 41 to rotate the lever 41 in a counterclockwise direction against the spring 43.

In the motion video mode, when the electromagnet (217 in FIG. 7) for the first blade 1 is energized, the blade 1 is rotated in the counterclockwise direction against the spring 4, is latched by the claw part 41b of the latch lever 41, as is shown in FIG. 10B. Then the electromagnet 217 is deenergized while the blade 1 is kept at the rotated position to open the aperture 10. When the apparatus is to be returned to the aperture closing condition shown in FIG. 10A, the electromagnet 40 is energized for a predetermined period of time to rotate the latch lever 41 in the counterclockwise direction against the spring 43. Thus, the first blade 1 is unlatched and is rotated in the clockwise direction by the spring 4 to close the aperture 10 as is shown in FIG. 10A.

On the other hand, in the still video mode, when the electromagnet 217 (FIG. 7) is energized, the first blade 1 is rotated to open the aperture 10 and is latched by the latch lever 41 as is shown in FIG. 10B. Then, the electromagnet 217 is deenergized. This condition corresponds to the preparatory exposure condition and the correction of the shutter speed is performed based on the luminous signal Y. The electromagnet 218 (FIG. 7) for the second blade 2 is then energized to rotate the second blade 2 in the counterclockwise direction against the spring 5, to close the aperture 10. At the same time, the electromagnet 217 for the first blade 1 is again energized. The electromagnet 40 is then energized to release the latching of the first blade 1 by the latch lever 41. Thus, the blades 1 and 2 are kept at their respective rotated positions by the electromagnets 217 and 218, respectively. The shutter control circuit 206 (FIG. 7) is then triggered and the electromagnets 218 and 217 are deenergized by the control circuit 206 at points in time separated by an amount corresponding to the corrected exposure time. This corresponds to the true exposure. The electromagnet 40 is then deenergized to release the latch lever 41.

Thus, as in the case of the third embodiment, the circuit system shown in FIG. 7 can be used in a manner such that the control circuit 201 has the control function shown in FIG. 8B for the control of the motion video mode and the control function shown in FIG. 8A for the control of the still video mode; provided that the steps S17 and S12 are changed in their order.

A fourth embodiment of the present invention will now be explained with reference to FIGS. 11A to 13B.

In the fourth embodiment, the triggering of the drive member 14 to cause the latch member 11 to latch the first blade 1 is performed by an electromagnet 46 through the trigger member 19. The electromagnet 46 is arranged to attract the arm part 19a of the drive member 19 to rotate the member 19 in the clockwise direction.

Figure 12:
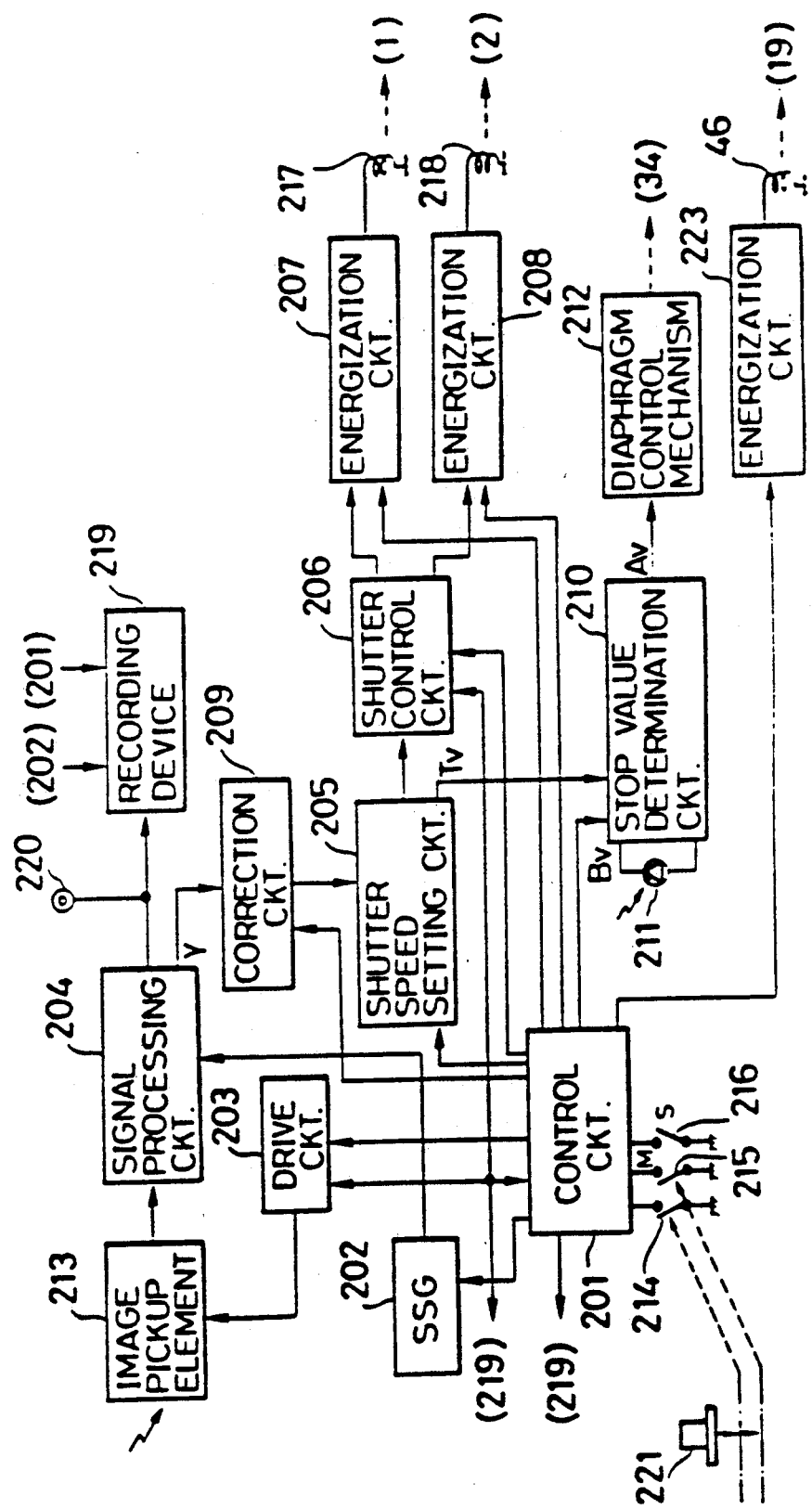
FIG. 12 is a block diagram of an electrical circuit system used with the camera exposure mechanism of FIGS. 11A and 11B.

As is shown in FIG. 12, the electrical circuit system for this embodiment includes an energization circuit 223 connected to energize the electromagnet 46 under the control of the control circuit 201.

Figure 11A:
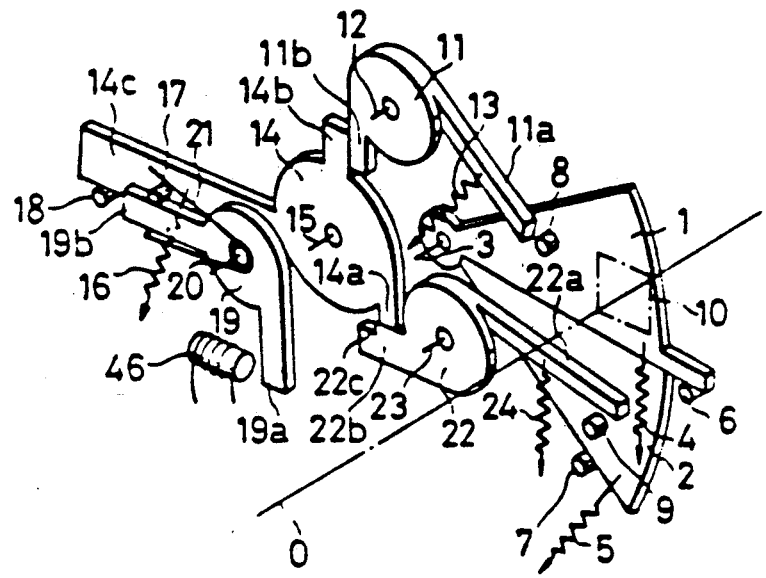
FIGS. 11A and 11B show a camera exposure mechanism of a fourth embodiment of the present invention in a rest condition and in a preparatory exposure condition, respectively.
Figure 11B:
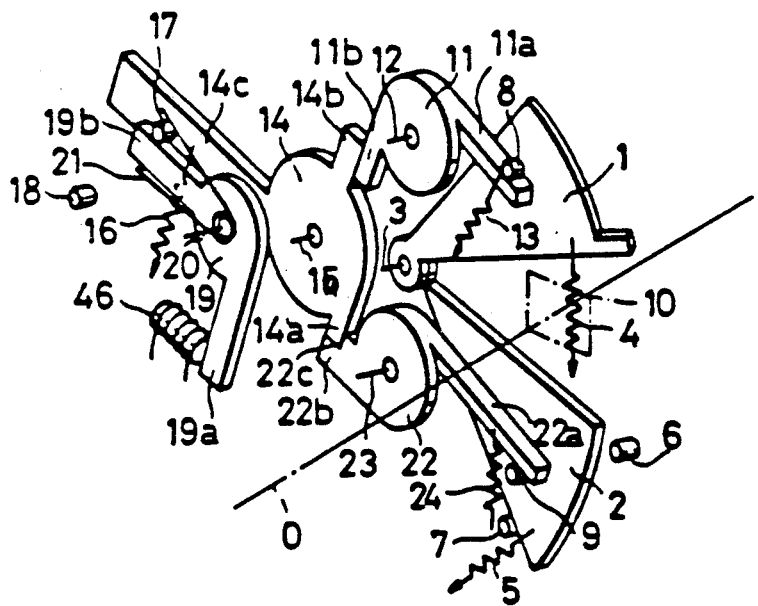
Figures 13A, 13B:
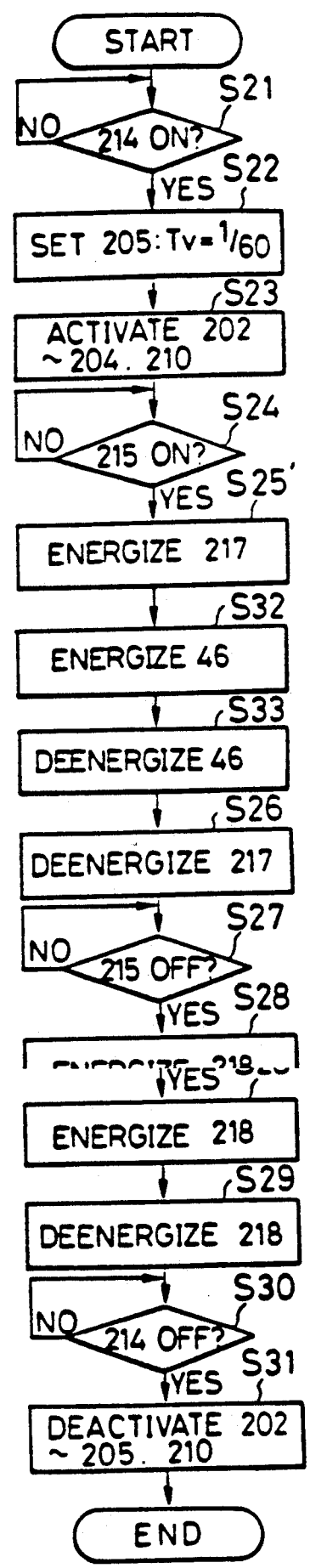
FIGS. 13A and 13B are flow control program diagrams showing control flows performed by a control circuit of FIG. 12 in a still video and in a motion video mode, respectively.

In the operation of the fourth embodiment, as shown in FIGS. 13A and 13B, the control circuit 201 commands the energization circuit 207 to energize the electromagnet 217 to rotate the first blade 1 in the counterclockwise direction (S06' in FIG. 13A and S25' in FIG. 13B); and then the control circuit commands the energization circuit 223 to energize the electromagnet 46 to rotate the trigger member 19 together with the drive member 14 in the clockwise direction against the spring 16 (S18 in FIG. 13A and S32 in FIG. 13B). Thus, the latch member 11 is rotated in the counterclockwise direction against the spring 13 and latches the first blade 1 at the pin 8 mounted thereon as is shown in FIG. 11B. The control circuit 201 then commands the energization circuit 201 to deenergize the electromagnet 46 (S19 in FIG. 13A and S33 in FIG. 13B); and thereafter the control circuit commands the energization circuit 207 to deenergize the electromagnet 217.

Other than the above, the structure and the function of the system of the fourth embodiment are the same as those of the first embodiment shown in FIGS. 2A to 4B.

As will readily be appreciated from foregoing, according to the feature of the various aspects of the present invention, it becomes possible to greatly lessen the consumption of the electrical power which is necessary to keep the electromagnetic drive shutter opened for a certain period of time.

Another embodiment of the present invention will be explained herein below with reference to FIGS. 14 to 17.

In a camera mechanism shown in FIG. 14, a pulse motor 301 is provided for presetting a stop value (an aperture size) to a diaphragm device to be explained later. The motor 301 has an output shaft 301a on which a gear 301b is mounted. A sector lever 302 is pivotally mounted at an axis 302a and has an arm part 302b and a gear part 302c with which the gear 301b meshes.

A stop value presetting ring 303 is rotatable held within a lens barrel (not shown) and has a cam part 303a for determining the stop value and an arm prt 303b which is engageable with the arm part 302b of the sector lever 302. The presetting ring 303 is urged by a spring 304 in a clockwise direction so that the tip of the arm part 303b strikes against the tip of the arm part 302b of the sector lever 302.

A bell crank lever 305 is pivotally mounted on an axis 305c within the lens barrel and has a pair of pins 305a and 305c on both sides thereof, respectively. The pin 305a is arranged to be engageable with the cam part 303a of the presetting ring 303.

A diaphragm blade driving ring 306 is also rotatably held within the lens barrel and has a projection 306a, an arm part 306c and a plurality of holes 306b (only one of them is illustrated in the Figure). The driving ring 306 is urged by a spring 309 in a clockwise direction so that the projection 306a engages with the pin 305b of the crank lever 305.

A diaphragm cam ring 308 is fixedly held within the lens barrel and is provided with a plurality of cam slots 308a (only one of them is illustrated in the Figure). A plurality of diaphragm blades 307 (only one of them is illustrated in the Figure) are arranged between the driving ring 306 and the cam ring 308 and each of which is provided with a pair of pins 307a and 307b on both sides thereof, respectively. The pins 307a are respectively engaged in the holes 306b of the driving ring 306 and the pins 307b are respectively engaged in the cam slots 308a of the cam ring 308.

A stop down ring 310 is also rotatably held within the lens barrel and has a pair of arm parts 310a and 310b. The stop down ring 310 is urged by a spring 311 in a counterclockwise direction so that the arm part 310a rotates through the arm part 306c the driving ring 306 in a counterclockwise direction against the spring 309.

A D.C. motor 312 is provided for operating the diaphragm device and a viewfinder mirror operating mechanism to be explained later. The motor 312 has a rotor shaft 312a on which a bevel gear 312b is mounted. Another bevel gear 313 is meshed with the bevel gear 312a and has a shaft on which three different cam discs 314, 315 and 316 are provided.

A release lever 317 is pivotally mounted on a pin 318b planted on a slide lever 318 and is urged by a spring 319 in a counterclockwise direction so that its pin 317a abuts on a side of the slide lever 318. The release lever 317 is engageable with a step part 316b of the cam disc 316. The slide lever 318 is slidably guided by pins 320 at its slots 318c and is urged upward by a spring 321.

A latch lever 322 is pivotally mounted at an axis 322a and is urged by a spring 323 in a counterclockwise direction. A tapered part 318a of the slide lever 318 is engageable with an arm part 322b of the latch lever 322.

A mirror retracting lever 324 is pivotably mounted at an axis 324e and is urged by a tension spring 337 in a clockwise direction. The latch lever 322 latches the retracting lever 324 by engaging its step part 322c with an arm part 324c of the retracting lever 324 in a condition where the spring 337 is charged (i.e. tensioned). A stopper pin 358 is provided to limit the clockwise movement of the retracting lever 324. A clutch lever 325 is pivotally mounted on a pin 324d mounted on the retracting lever 324 and is urged by a spring 326 in a clockwise direction (as viewed from above).

A view finder mirror operating lever 327 is pivotally mounted on an axis 327d and is urged by a spring 338 in a counterclockwise direction. A stopper pin 353 is provided for the operating lever 327. A hook part 325a of the clutch lever 325 is engageable with a pin 327a planted on the operating lever 327. The arm part 310b of the stop down ring 310 is received by a bent up part 327c of the operating lever 327.

A viewfinder mirror supporting lever 328 is pivotally mounted on an axis 328c and is supporting a viewfinder mirror 329 at its inclined end part 328b so that the mirror 329 is held in a predetermined inclined condition with respect to a picture taking optical axis O. The supporting lever 328 is engaged with a pin 327b planted on the operating lever 327 at its fork part 328a provided on another end thereof. The mirror 329 is held at a predetermined viewing position in the optical path when the operating lever 327 is pivotted by the spring 338 in the counterclockwise direction until it is restricted by the stopper pin 353. In this condition, the stop down ring 310 keeps the diaphragm device at its fully opened state.

A link lever 330 is pivotally mounted on an axis 330c and its fore end part 330a is engageable with a projection 314a of the first cam disc 314. A clutch release lever 331 is pivotally mounted on an axis 331c and is urged by a spring 332 in a counterclockwise direction so that its end part 331b strikes against a tail end part 330b of the link lever 330. A pin 331a planted on another end part of the release lever 331 is engageable with an arm part 325b of the clutch lever 325.

A charge lever 333 is pivotally mounted on an axis 333c and is urged by a spring 357 in a counterclockwise direction so that a cam follower part 333a at its fore end engages with a charge cam part 316a of the third cam disc 316. A tail end part 333b of the charge lever engageable with an arm part 324a of the retracting lever 324.

A stop lever 334 is pivotally mounted on an axis 334c and is urged by a spring 335 in a clockwise direction so that part 334a engages with a recess part 315a of the a hook part 334a engages with a recess part 315a of the second cam disc 315 when it confronts therewith. A normally open switch 336 is arranged to be closed by a tail end part 334b of the stop lever 334 when its hook part 334a engages into the recess 315a of the cam disc 315 and thus the disc 315 is stopped its rotation.

There are provided an optical low pass filter 339 (a crystal filter) and an image pickup element 351 (such as a CCD) in the optical path. Between the optical filter 339 and the image pickup element 351, there are provided a pair of shutter blades 340 and 341. These shutter blades 340 and 341 are pivotally mounted on a common axis 340c and are respectively urged by springs 342 and 343 in a clockwise direction. Stopper pins 340b and 341b are respectively provided for the shutter blades 340 and 341. The blades 340 and 341 are provided with driving coils 344 and 345, respectively, and there are also provided permanent magnets 346 and 347 for the coils 344 and 345, respectively. The first shutter blade 340, when it is rotated in the clockwise direction by the spring 342 until it strikes on the stopper pin 340b, closes a picture taking aperture 352 provided in front of the image pickup element 351 and when the coil 344 is energized, the blade 340 is rotated in the counterclockwise direction against the spring 342 and opens the aperture 352. The second shutter blade 341, when it is rotated in the clockwise direction by the spring 343 until it is restricted by the stopper pin 341b, opens the aperture 352 and when the coil 345 is energized, the blade 341 is rotated in the counterclockwise direction against the spring 343 and closes the aperture 352.

A shutter blade latch lever 348 is pivotally mounted on an axis 348d and is urged by a spring 349 in a clockwise direction so that it strikes on a stopper pin 350. The latch lever 348 is provided with a claw part 348a to latch the first shutter blade 340 at its tail end part 340a when it is rotated in the counterclockwise direction and opens the aperture 352. The second shutter blade 341 is provided with a bent back part 341a at its tail end part which strikes on an arm part 348b of the latch lever 348 and rotates the same to cause the claw part 348a to release the latching of the first shutter blade 340 when the second shutter blade 341 is rotated in the counterclockwise direction.

An arresting lever 354 is pivotally mounted on an axis 354c and is urged by a spring 355 in a clockwise direction. The arresting lever 354 is provided with a hook part 354a to arrest the latch lever 348 at its arm part 348c. A release lever 356 is pivotally mounted on an axis 356c and is urged by a spring 357 in a clockwise direction so that its end parts 356a and 356b strike against an arm part 324b of the retracting lever 324 and a tail end part 354b of the arresting lever 354, respectively.

Next, in a circuit system shown in FIG. 15, a synchronization signal generation circuit 402 (SSG hereinafter) is provided for generating synchronization signals. A drive circuit 403 is connected to drive the image pickup element 351 in response to the synchronization signal supplied by the SSG circuit 402. A signal processing circuit 404 of known circuit construction is connected to receive and process the output signal of the image pickup element 351. A video floppy disc recording device 416 of known construction is connected to receive and record the output signal of the processing circuit 404.

A shutter speed setting circuit 405 is provided for setting a desired shutter speed. A shutter control circuit 406 of a known construction is connected to control the deenergization of the coils 344 and 345 in response to the output signal of the shutter speed setting circuit 405 and the synchronization signal supplied from the SSG 402. Energization circuits 407 and 408 are respectively arranged to energize the coils 344 and 345 in response to the control signal supplied from a control circuit 401 and deenergize the coils 344 and 345 in response to the control signal supplied from the shutter control circuit 406.

A correction circuit 409 is connected to supply a shutter speed correction signal to the shutter speed setting circuit 405 based on a luminous signal Y supplied by the signal processing circuit 404. A stop value determination circuit 410 of a known construction is connected to receive a shutter speed signal Tv supplied from the shutter speed setting circuit 405 and an object brightness signal Bv supplied by an object brightness measuring element (photocell) 411. The measuring element 411 may be positioned to receive an object light via the view finder mirror 329 when it is at the position on the optical axis O as is shown in FIG. 14.

A pulse motor control circuit 412 is connected to control the pulse motor 301 in response to a stop value signal Av supplied from the determination circuit 410. A D.C. motor drive circuit 413 drives the motor 312 under the control of the control circuit 401. The control circuit 401 controls the entire circuit system based on the conditions of switches 414, 415 and 336. The first and second trigger switches 414 and 415 are each of the normally open type and are arranged to be closed by a first and a second step of the depression of a trigger button 417, respectively. The control circuit 401 may comprise a micro-computer. The control circuit 401 has a control function shown by the flow chart of FIG. 16.

Next, the operation of this embodiment will be explained with reference to FIGS. 14 to 16.

Figure 14:
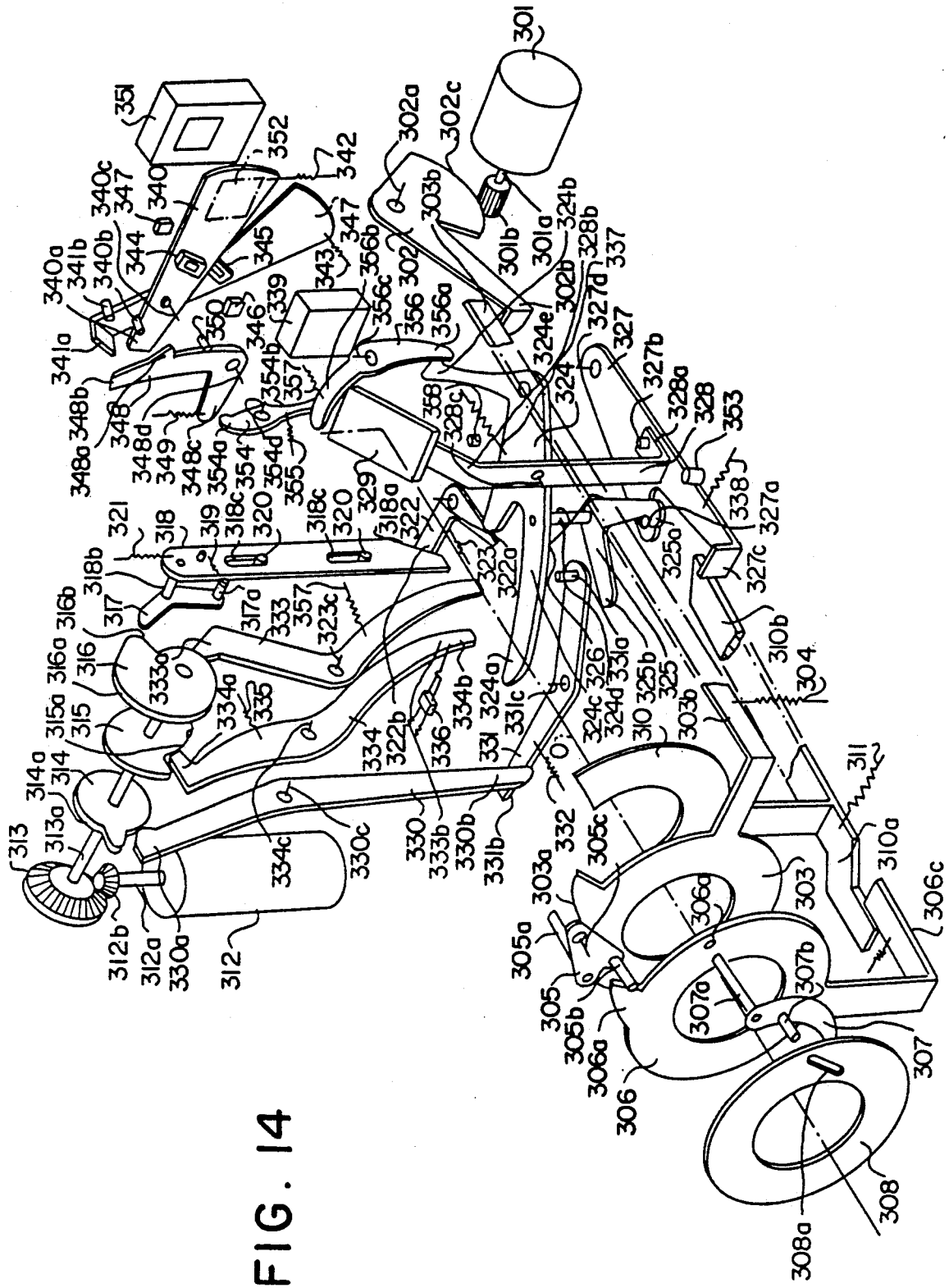
FIG. 14 shows a camera exposure mechanism of a fifth embodiment of the present invention.
Figure 15:
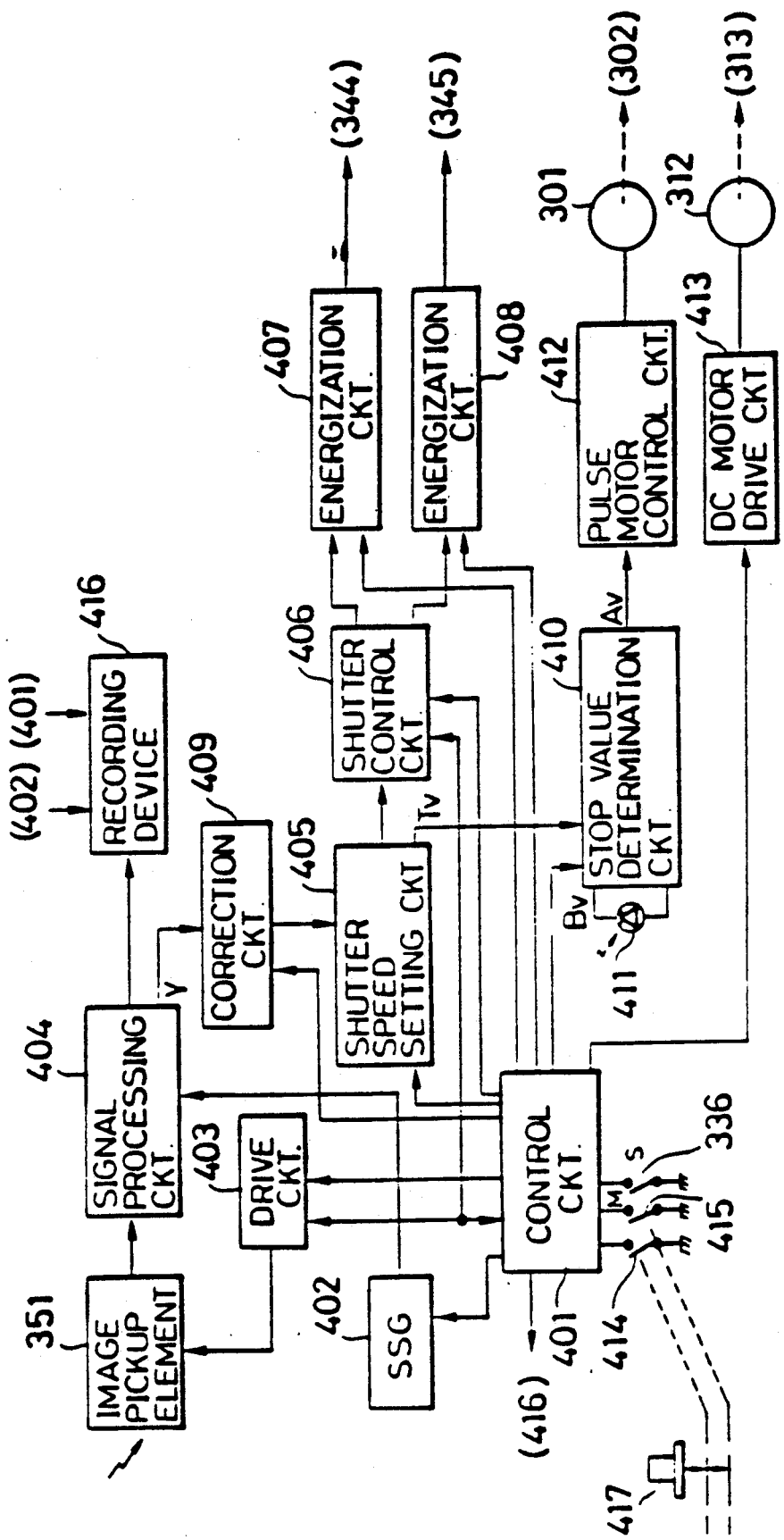
FIG. 15 shows an electrical circuit system used in the fifth embodiment.
Figure 16:
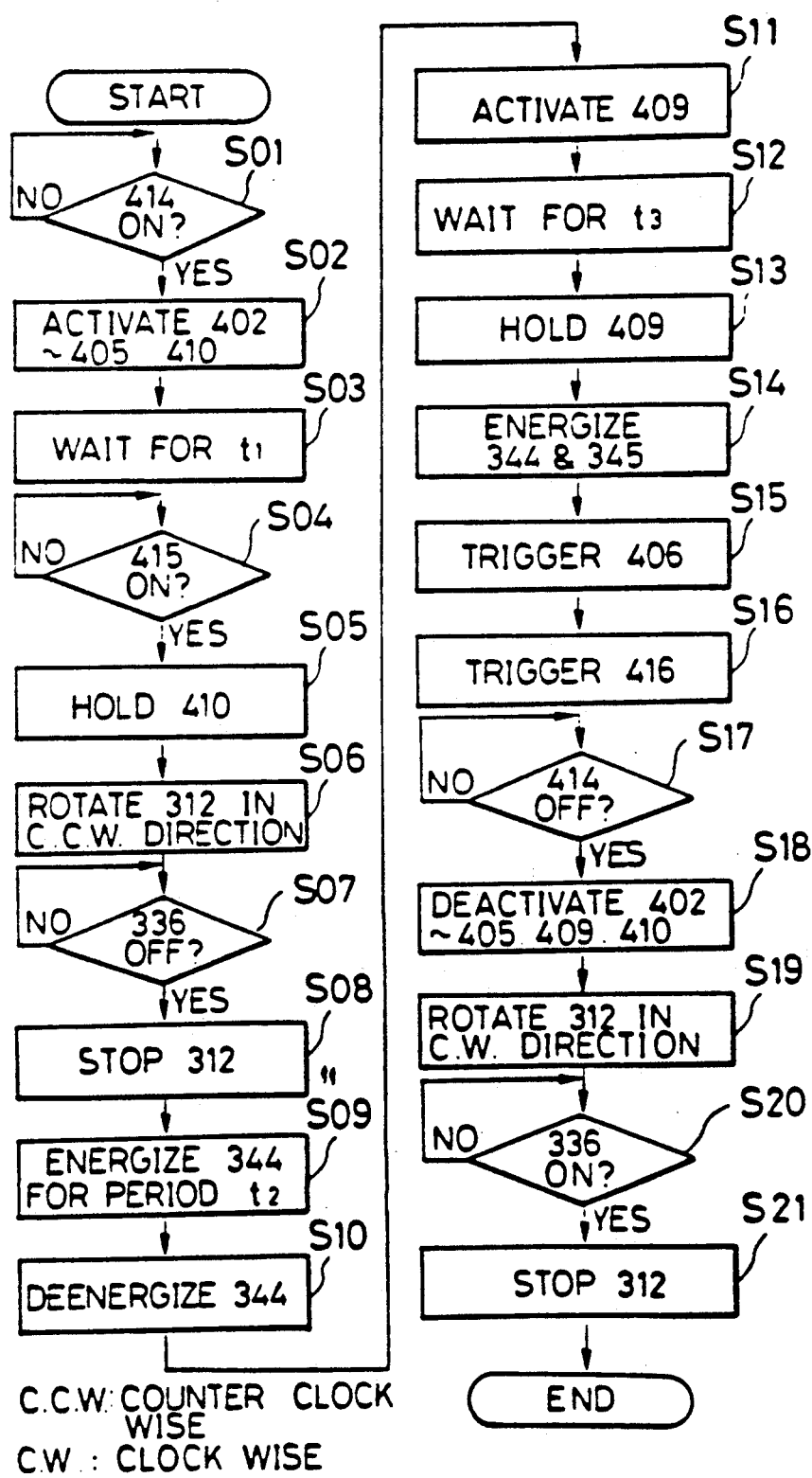
FIG. 16 is a flow control program diagram which shows a control flow performed by a control circuit in FIG. 15.

While the apparatus is in its charged condition as shown in FIG. 14, the control circuit 401 (FIG. 15) checks the first trigger switch 414 to ascertain whether it is closed by the depression of the trigger button 417 to the extent of the first step (step S01 in FIG. 16). If the switch 414 is found to be closed, the control circuit 401 causes the circuits 402, 403, 404, 405 and 410 to operate (step S02 in FIG. 16). Thus, the SSG circuit 402 begins to generate the synchronization signals and the drive circuit 403 also begins to drive the pickup element 351 based on the supplied synchronization signal. The output signal of the pickup element 351 is processed in the processing 0 circuit 404 based on the synchronization signals supplied from the SSG circuit 402. On the other hand, the stop value determination circuit 410 determines the appropriate stop value based on the object brightness signal Bv supplied by the brightness measuring element 411 and the shutter speed signal Tv supplied by the shutter speed setting circuit 405 in accordance with the preset shutter speed set to the circuit 405, and produces the stop value signal Av corresponding to the determined stop value. In response to the stop value signal Av, the pulse motor control circuit 412 operates the pulse motor 301 to adjust the rotational position of the stop value presetting ring 303 through the sector lever 302 in accordance with the stop value represented by the signal Av. Thus, the stop value determined by the determination circuit 410 is preset to the diaphragm device.

The control circuit 401 waits for a time period of $t_1$ (step S03 in FIG. 16) which is sufficient for the completion of the above explained stop value determination and presetting operation and then checks the second trigger switch 415 to ascertain whether it is closed by the depression of the trigger button 417 to the extent of the second step (step S04 in FIG. 16). If the switch 415 is found to be closed, the control circuit 401 causes the stop value determination circuit 410 to hold the determined stop value (step S05 in FIG. 16). Then, the control circuit 401 commands the motor drive circuit 413 to cause the motor 312 to rotate in the counterclockwise direction in FIG. 14 (step S06 in FIG. 16).

When the motor 312 rotates in the counterclockwise direction, the cam discs 314, 315 and 316 are rotated in the clockwise direction through the bevel gears 312b and 313. As a result, the third cam disc 316 depresses, through its step part 316b, the release lever 317 together with the slide lever 318 against spring 321. When the slide lever 318 is depressed, its tapered part 318a engages the latch lever 322 and rotates in the clockwise direction against the spring 323. As a result, the step part 322c of the latch lever 322 releases the retracting lever 324. The retracting lever 324 is then rotated in the clockwise direction by the spring 337. The retracting lever carries with it the clutch lever 325 which in turn rotates the mirror operating lever 327 in the clockwise direction against the spring 338. The mirror supporting lever 328 is thus rotated in the clockwise direction to retract the viewfinder mirror 329 from the optical path.

At the same time, the stop down ring 310 is pressed at its arm part 310b by the bent up part 327c of the operating lever 327 and is rotated in the clockwise direction against the spring 311. This allows the blade driving ring 306 to be rotated in the clockwise direction by the spring 309 until its projection 306a engages the 305b of the crank lever 305 and swings it to bring the pin 305b against the cam part 303a of the presetting ring 303. Thus, the diaphragm device is stopped down and the diaphragm blades 307 form an aperture corresponding to the stop value determined by the stop value determination circuit 410 and preset through the presetting ring 303.

On the other hand, when the retracting lever 324 rotates in the clockwise direction, the stop lever 334 is pressed at its lower end part 334b by the arm part 324a of the retracting lever 324 and is rotated in the counterclockwise direction against the spring 335. Thus, the hook part 334a of the stop lever 334 is pulled away from the recess part 315a of the second cam disc 315. At the same time the normally open switch 336 is allowed to open. The control circuit 401, after the step S06 in FIG.

16, repeatedly checks the switch 336 to ascertain whether it is open (step S07 in FIG. 3); and if the switch 336 is ascertained to be open, the control circuit 401 commands the motor drive circuit 413 to cause the motor 312 to stop (step S08 in FIG. 16).

The control circuit 401 then commands the energization circuit 407 to energize the coil 344 of the first shutter blade 340 for a time period of $t_2$ (step S09 in FIG. 16). Thus, the first shutter blade 340 is rotated in the counterclockwise direction against the spring 342 by magnetic repulsion generated between the coil 344 and the permanent magnet 346 and is latched at its tail end part 340a by the claw part 348a of the latch lever 348. When the time period of $t_2$ has elapsed, the control circuit 401 commands the energization circuit 407 to deenergize the coil 344 (step S10 in FIG. 16). The time period of $t_2$ is selected to be sufficient for the first shutter blade 340 to be rotated in the counterclockwise direction and latched by the latch lever 348. Thus, the aperture 352 is kept opened; and while the aperture is in this condition, the control circuit 401 causes the correction circuit 409 to operate (step S11 in FIG. 16). The correction circuit 409 detects the luminosity of the object scene based on the luminous signal Y supplied by the signal processing circuit 404 and produces the shutter speed correction signal. In response to this correction signal, the shutter speed setting circuit 405 corrects the set shutter speed and provides a corrected shutter speed signal to the shutter control circuit 406. After the step S11, the control circuit 401 waits for a time period of $t_3$ (step S12 in FIG. 16) which is sufficient for the completion of the above explained shutter speed correction operation and then causes the correction circuit 409 to hold the correction signal (step S13 in FIG. 16).

The control circuit 401 then commands the energization circuits 407 and 408 to energize the coils 344 and 345 (step S14 in FIG. 16). When the coil 345 is energized, the second shutter blade 341 is rotated in the counterclockwise direction against the spring 343 by the magnetic force of repulsion generated between the coil 345 and the permanent magnet 347; and the shutter blade 341 closes the aperture 352. At this time, the bent back part 341a of the second shutter blade 341 presses the latch lever 348 at its arm part 348b to rotate the latch lever 348 in the counterclockwise direction against the spring 349. Thus, the claw part 348a of the latch 348 unlatches the first shutter blade 340; but the blade 340 is kept at the counterclockwisely rotated state by the magnetic force of repulsion generated between the coil 344 and the magnet 346. On the other hand, the latch lever 348 is arrested at its counterclockwisely rotated state by the arresting lever 354 since the arresting lever 354 is switched to an operative position by the spring 355 due to the counterclockwise rotation of the release lever 356 responding to the clockwise rotation of the arm part 324b of the retracting lever 324.

The control circuit 401 then triggers the shutter control circuit 406 (step S15 in FIG. 16). When triggered, the shutter control circuit 406 causes, in response to the vertical synchronization signal supplied by the SSG circuit 402 right after the triggering, the energization circuit 408 to deenergize the coil 345. Then, after the time lag corresponding to the shutter speed (exposure time) indicated by the corrected shutter speed signal supplied by the shutter speed setting circuit 405, the shutter control circuit 406 causes the energization circuit 407 to deenergize the coil 344. Thus, the second and the first shutter blades 341 and 340 are rotated in the clockwise direction by their respective springs 343 and 342 at times separated by the above mentioned time lag; and by this, the image pickup element 351 is exposed to the object light for a time period corresponding to such time lag. The image signal generated in the pickup element 351 in response to the light exposure is read out and supplied to the recording device 416 after being processed by the signal processing circuit 404 during the field period next following that in which the exposure of the pickup element 351 has been carried out. Therefore, before commencement of the reading out of the image signal from the pickup element 351 after the exposure thereof, the control circuit 401 triggers the recording device 416 (step S16 in FIG. 16); and by this, the recording device 416 records on the floppy disc the image signal supplied by the processing circuit 404 and corresponding to one TV field based on the synchronization signal supplied by the SSG circuit 402.

After the signal recording by the recording device 416, the control circuit 401 checks the switch 414 to ascertain whether it is open (step S17 in FIG. 16). If the switch 414 is ascertained to be open, the control circuit 401 deactivates the circuits 402, 403, 404, 405, 409 and 410 (step S18 in FIG. 16). Then the control circuit 410 commands the motor drive circuit 413 to cause the motor 312 to rotate in the clockwise direction (step 19 in FIG. 16). This clockwise rotation of its motor 312 rotates the cam discs 314, 315 and 316 in the counterclockwise direction through the bevel gears 312b and 313. At the same time, the projection 314a on the cam disc 314 causes the link lever 330 to rotate in the counterclockwise direction. By this, the release lever 331 is rotated in the clockwise direction against the spring 332 and the pin 331a of the release lever 331 causes the clutch lever 325 to rotate in the counterclockwise direction against the spring 326 and to release the operating lever 327. This allows the operating lever 327 to be rotated in the counterclockwise direction by the spring 338 until it is restricted by the stopper pin 353. By this, the supporting lever 328 is rotated in the counterclockwise direction to bring the mirror 329 to the viewing position in the optical path. At the same time, the stop down ring 310 follows the operating lever 327 and is rotated in the counterclockwise direction by the spring 311 while hauling the driving ring 306 in the same direction against the spring 309. Thus, the diaphragm device is fully opened.

On the other hand, by the counterclockwise rotation of the cam disc 316, the charge lever 333 is rotated in the clockwise direction against the spring 357; and the lower end 333b of the charge lever 333 engages the arm part 324a of the retracting lever 324 and rotates the retracting lever 324 in the counterclockwise direction against the spring 337. By this, the stop lever 334 is freed from engagement with the arm part 324a of the retracting lever 324 and becomes free to engage with the cam disc 315 by the action of the spring 335. When the retracting lever 324 is rotated to a predetermined position, the arm part 325a of the clutch lever 325 engages with the pin 327a on the operating lever 327. At the same time, the step part 322c of the latch lever 322 latches the arm 324c of the retracting lever 324 and holds the retracting lever against the charged spring 337. On the other hand, the release lever 356 is freed from engagement with the arm part 324b of the retracting lever 324; and this allows the release lever 356 to be rotated in the clockwise direction by the spring 357. This causes the arresting lever 354 to rotate in the counterclockwise direction against the spring 355 and to release the latch lever 348. Thus, the latch lever 348 is rotated in the clockwise direction by the spring 349 until it is restricted by the stopper pin 350. Although, at the final stage of the counterclockwise rotation of the cam disc 316, the highest lift portion of the cam disc 316 engages with the release lever 317, the release lever 317 is free to rotate in the clockwise direction and does not obstruct the cam disc 316.

After the retracting lever 324 has been latched by the latch lever 322 with the spring 337 being charged, the cam disc 315 rotates until its recess 315a confronts the hook part 334a of the stop lever 334. The hook part 334a engages the recess 315a and stops the cam disc 315. At the same time, the tail end part 334b of the stop lever 334 closes the switch 336. On the other hand, after the step S19, the control circuit 401 repeatedly checks the switch 336 to ascertain whether it is closed (step S20 in FIG. 16); and if it is ascertained to be closed, the control circuit 401 commands the motor drive circuit 413 to stop the motor 312 (step S21 in FIG. 16). This ends the operation.

Figure 17:
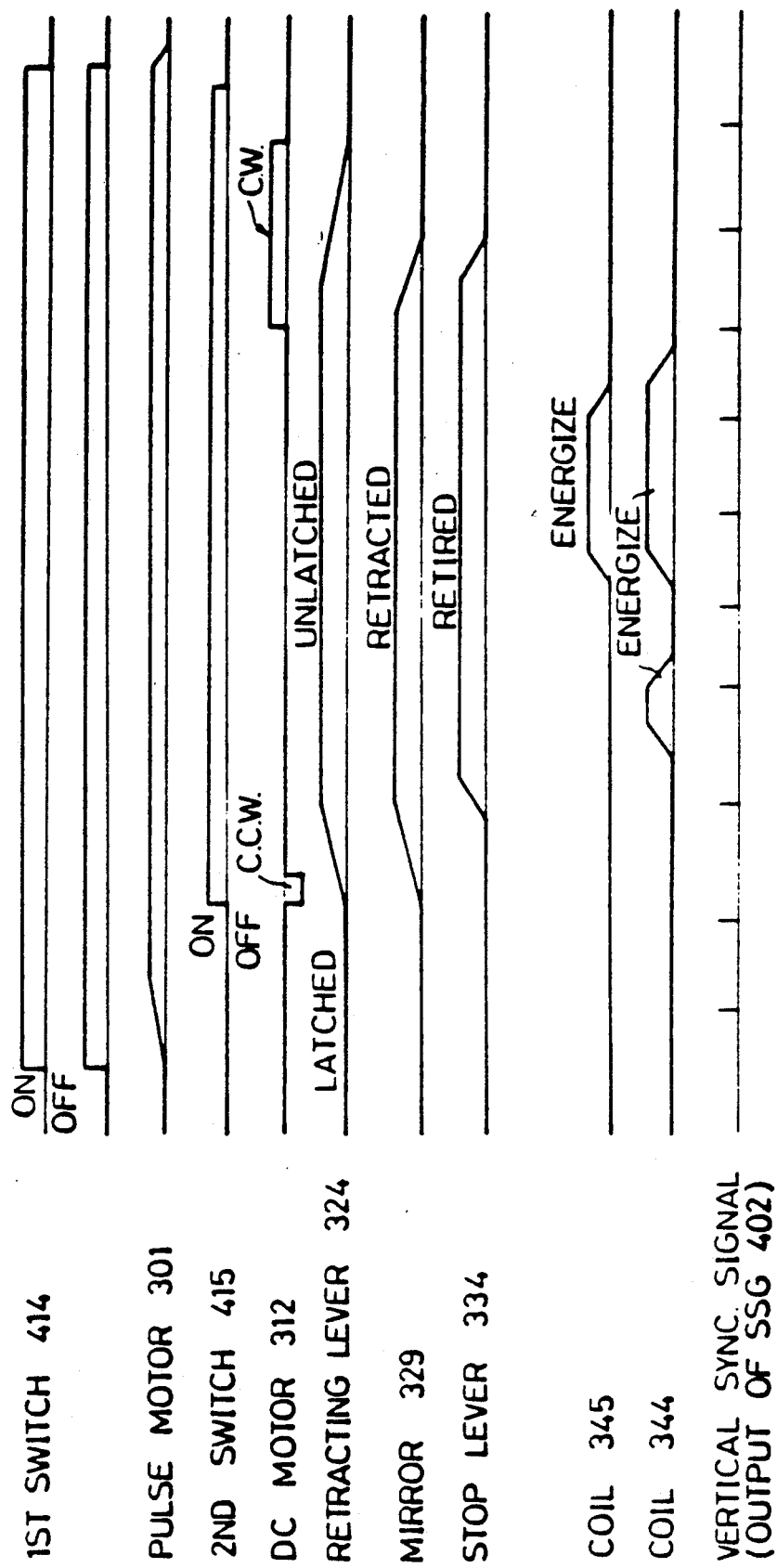
FIG. 17 shows the timing relationship of operation of the elements in FIG. 15.

FIG. 17 illustrates the timings of the operations of the elements in FIGS. 14 and 15.

In the embodiment of FIGS. 14 and 15, though the correction of the exposure value is arranged to be carried out by controlling shutter speed (i.e. the exposure time) based on the luminous signal Y, the correction may be carried out by controlling the stop value (i.e. the aperture size) or both shutter speed and aperture size based on the luminous signal Y.

As will be appreciated from foregoing, in the above described embodiment, mirror retraction and mirror return are performed by using the normal (or reverse) and the reverse (or normal) rotation of the motor, respectively. Therefore, the mirror operating mechanism and the camera mechanism are simplified. Moreover, they can be small in size and reliable in their operation.

Further, the features of the present embodiment, especially the mirror drive mechanism using a reversible motor may be used in a corresponding mechanism in a film camera.

A sixth embodiment of the present invention will now be explained with reference to FIGS. 18 to 21. The sixth embodiment includes the following construction in addition to that of the first embodiment explained above.

Figure 18:
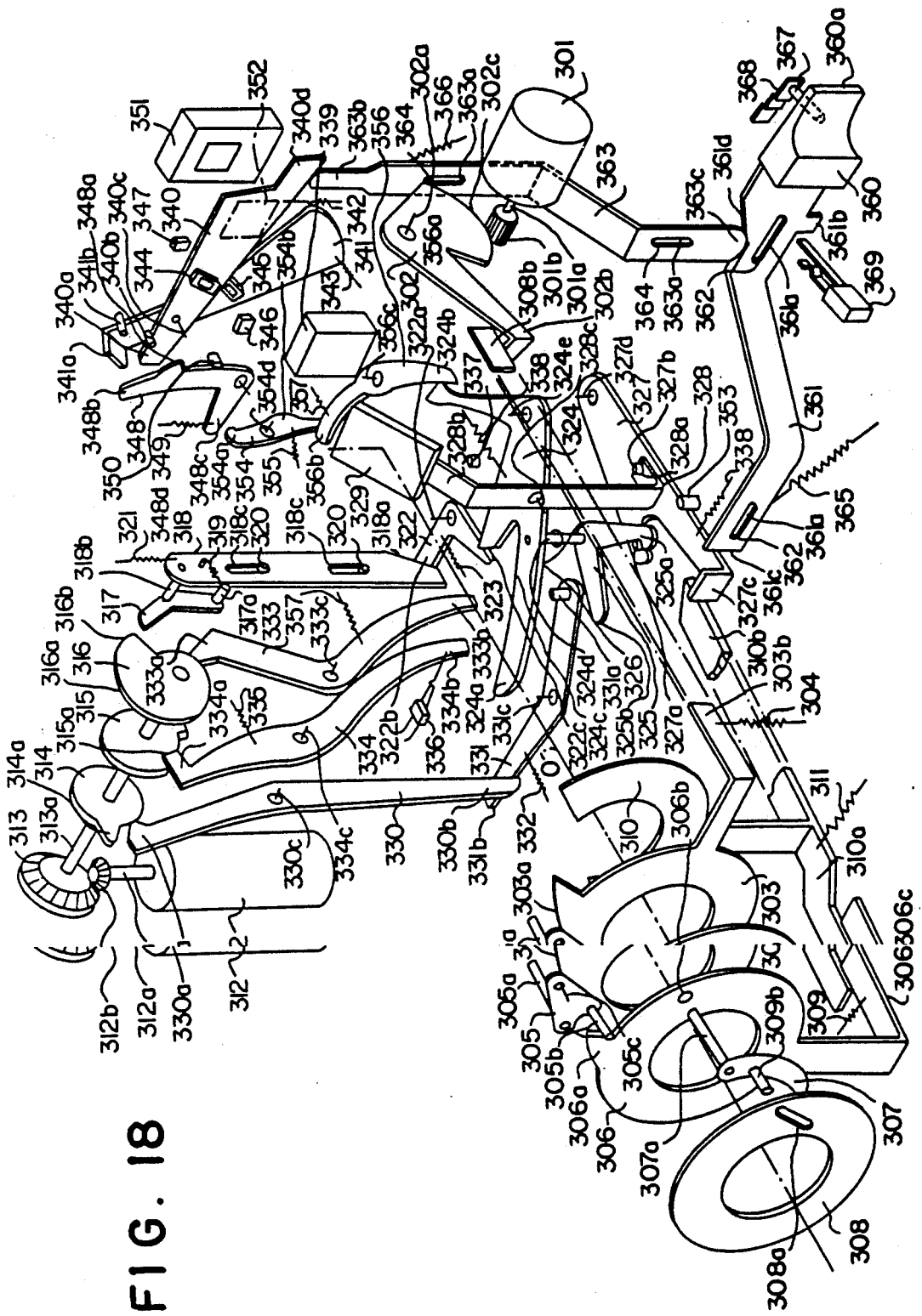
FIG. 18 shows a camera exposure mechanism of a sixth embodiment of the present invention.
Figure 19:
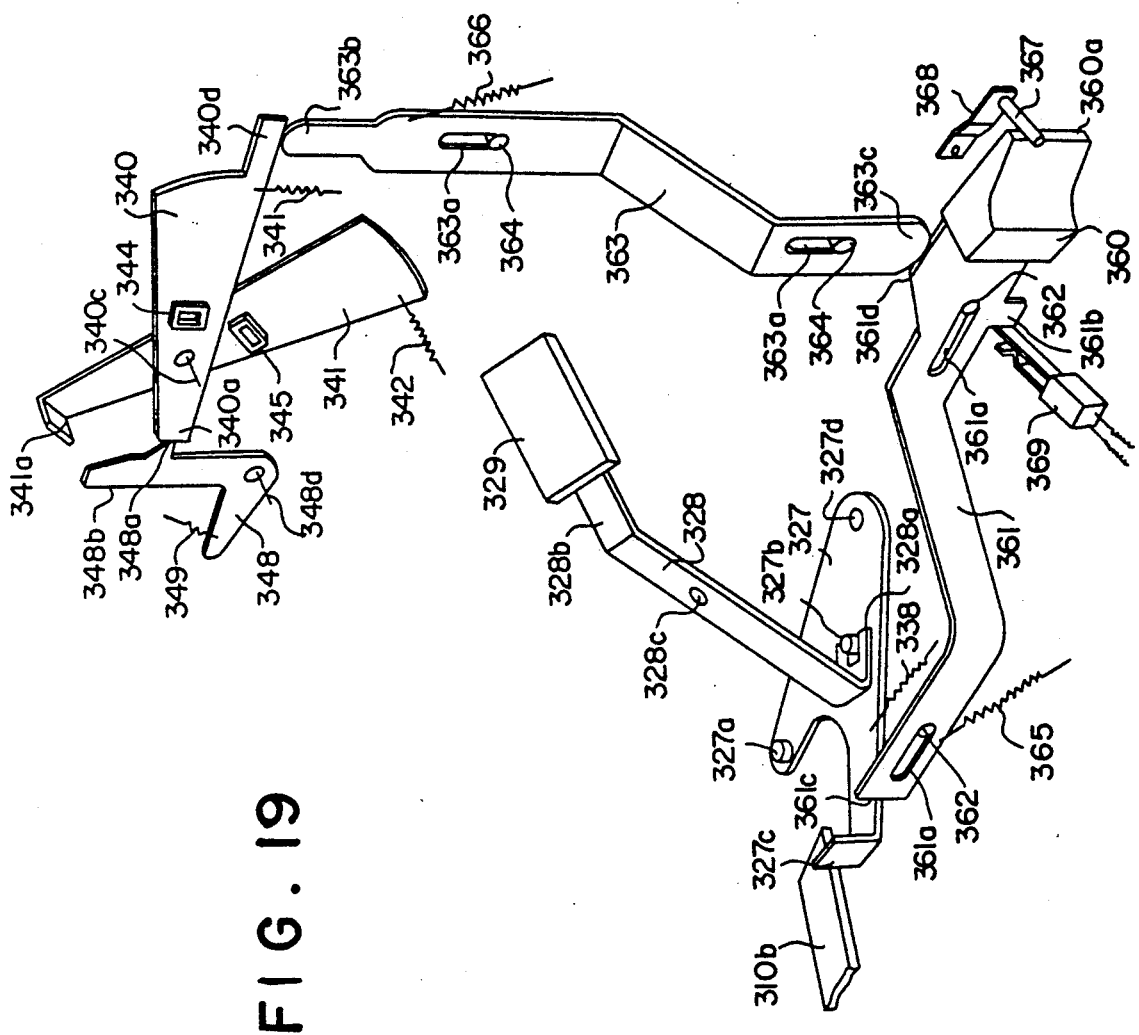
FIG. 19 shows a part of the mechanism shown in FIG. 18 at the time of setting in a motion video mode.

In the camera mechanism shown in FIGS. 18 and 19, a slide knob 360 is attached to a tail end part of a slide plate 361 which is slidably guided by a pair of pins 362 at slots 361a of the slide plate. The slide plate 361 is urged by a spring 365 in the rightward direction. A fore end part 361c of the slide plate 361 faces the operating lever 327 so that it rotates the lever 327 in the clockwise direction against the spring 338 when the plate 361 is slid leftward against the spring 365. Moreover, a downward projection part 361b of the slide plate 361 is provided for closing a normally open type switch 369 when the plate 361 is slid to its leftward position. A slide lever 363 is slidably guided by a pair of pins 364 at slots 363a thereof and is urged upwardly by a spring 366. A tail end part 363c of the lever 363 rides on a cam part 361d of the slide plate 361 while a fore end part 363b of the lever 363 faces an arm part 340d of the first shutter blade 340 so that it rotates the blade 340 against the spring 342 to open the aperture 352 when the lever 363 is moved upward by the action of the cam part 361d of the plate 361 when the plate is moved to its leftward position. A stopper pin 367 is held by a leaf spring 368 and is engageable with an edge part 360a of the knob 360 to keep the same at its leftward position as shown in FIG. 19.

Figure 20:
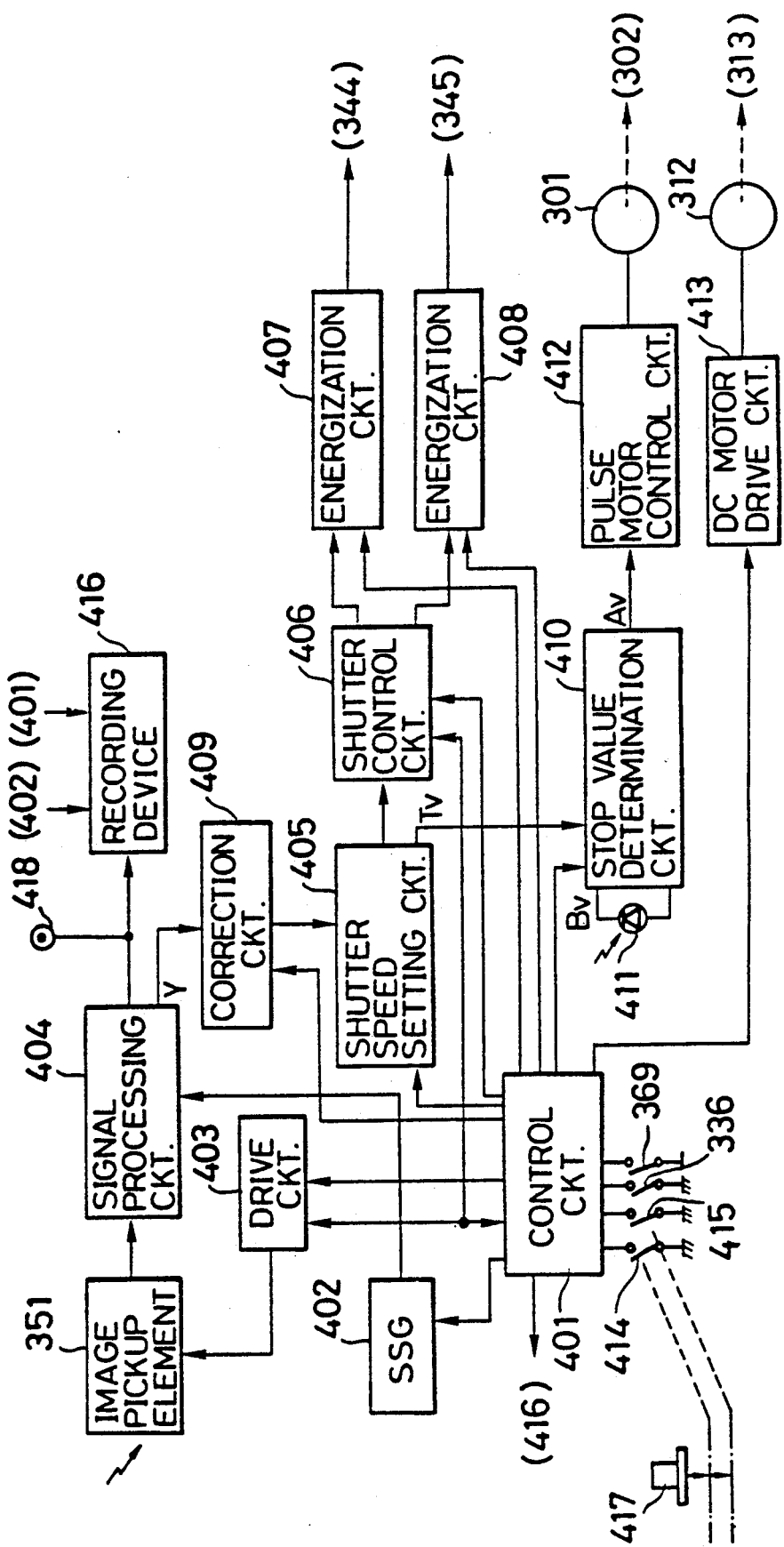
FIG. 20 shows an electrical circuit system of the sixth embodiment.

In a circuit system shown in FIG. 20, the switch 369 is connected to the control circuit 401. The control circuit 401 selects the operation mode of the system, i.e. either a still video mode or a motion video (movie) mode, depending upon the state of the switch 369. Moreover, there is provided an external output terminal 418 connected to the output of the signal processing circuit 404 to provide remote output of the video signal from the circuit 404. Furthermore, in this embodiment, the object brightness measuring element 411 is positioned so as to receive the object light through the diaphragm device but not through the viewfinder mirror 329.

Other than the above, the same construction shown in FIGS. 14 and 15 is used in the embodiment of FIGS. 18–20.

In this embodiment, if the knob 360 is not pushed leftward, the camera operates in the same way as that of the first embodiment. In this case, the control circuit 401 checks switch 369 to ascertain whether it is open (step S22 in FIG. 21) after the switch 414 is ascertained to be closed at the step S01 in FIG. 21. If the switch 369 is open, the control circuit 401 goes to the step S02 in FIG. 21. Thus, still video recording is performed.

On the other hand, if the knob 360 is pushed leftward as shown in FIG. 19, the slide plate 361 is slid in the same direction and rotates the operating lever 327 in the clockwise direction. Thus, the mirror 329 is retracted from the optical path and the diaphragm device is stopped down through the stop down ring 310. At the same time, the projecting part 361b closes the switch 369 while the slide lever 363 is moved upward by the action of the cam part 361d of the plate 361 to push up the first shutter blade 340. Thus, the aperture 352 is opened and the blade 340 is held at a position just before the position at which is becomes latched by the latch lever 348. Moreover, the knob 360 is retained at its pushed-in position by the stopper pin 367 which protrudes by the spring 368 to engage with the edge part 360a of the knob 360.

Figure 21:
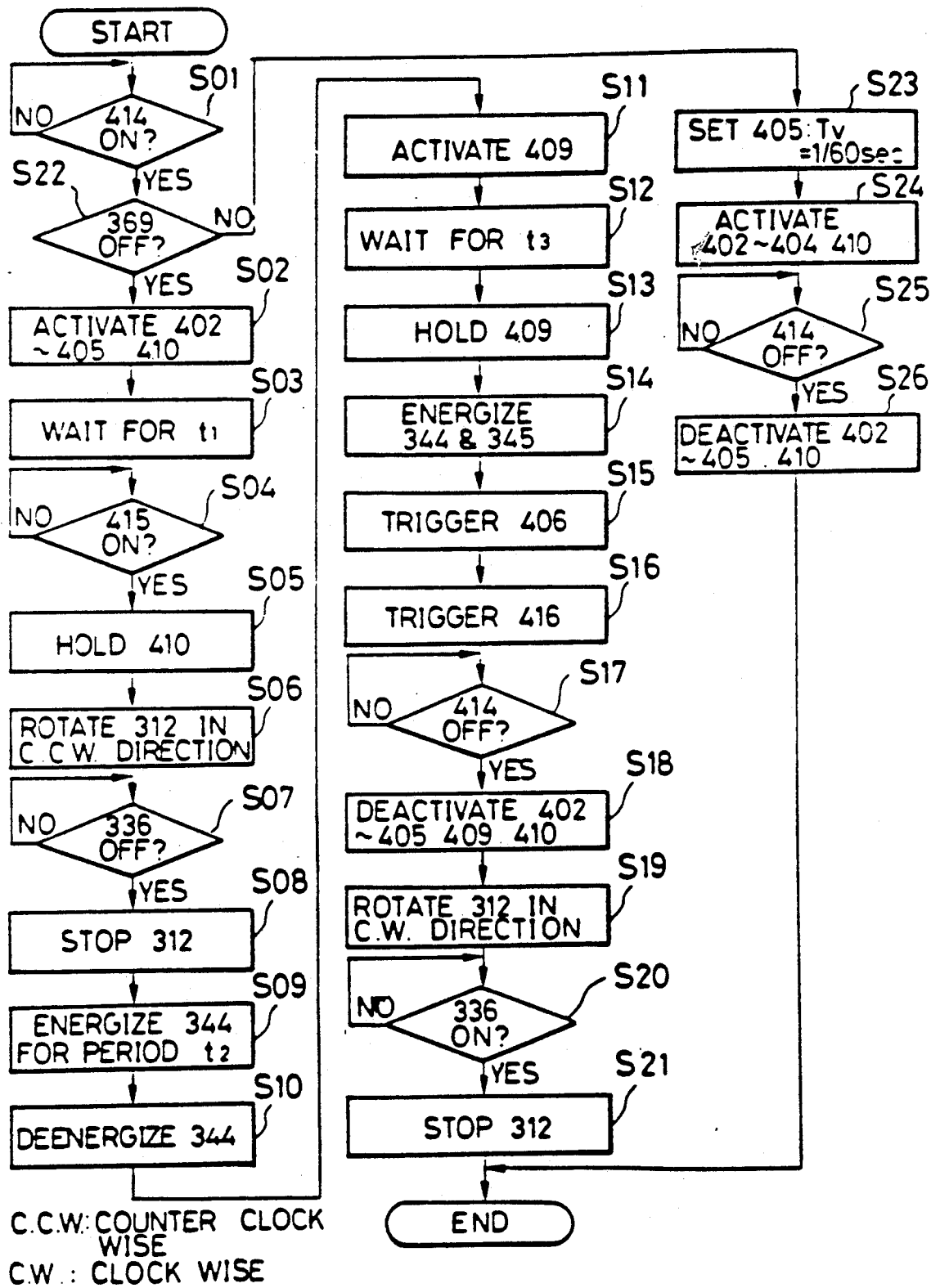
FIG. 21 shows a control flow performed by the control circuit of FIG. 20.

In this condition, when the first trigger switch 414 is closed (step S01 in FIG. 21), the control circuit checks the switch 369 to ascertain whether it is open (step S22 in FIG. 21). If it is found not open, the control circuit 401 causes the shutter speed setting circuit 405 to set the shutter speed (exposure time) (Tv) at 1/60 sec. (step S23 in FIG. 21) and the activates the circuits 402 or 404 and 410 (step S24 in FIG. 16). Thus, in this case, the stop value determination circuit 410 determines or controls the stop value (Av) based on the brightness signal Bv applied by the measuring elements 411 which receives the object light through the stopped down diaphragm device and the shutter speed signal Tv representing an exposure time of 1/60 sec. which corresponds to the TV field rate under the standard NTSC system. (Therefore, under the standard PAL system, an exposure time of 1/50 sec. may be preferable.) In accordance with the stop value signal Av produced by the determination circuit 410, the motor control circuit 412 controls the pulse motor 301 to adjust the diaphragm aperture of the diaphragm device.

Thus, in the motion video (movie) mode, the signal processing circuit 404 produces a succession of video signals corresponding to the motion picture and these signals can be taken out through the external terminal 418. Therefore, it is possible to record the signals on tape by connecting a VCR (Video Cassette Recorder) to receive the signals from the terminal 418. Also, it is possible to monitor the image by using an electronic view finder connected to receive the signals from the terminal 418.

During operation of the apparatus, the control circuit 401 repeatedly checks the switch 414 to ascertain whether it is open (step S25 in FIG. 21); and if it is found to be open, the control circuit 401 deactivates the circuits 402 to 405 and 410 to stop the operation (step S26 in FIG. 21).

When it is desired to return to the still video mode from the motion video mode, this change-over is done simply by pushing the stopper pin 367 against the leaf spring 368 and releasing the restriction of the knob 360 by the pin 367. That is, when released, the knob 360 and the slide plate 361 are moved in the rightward direction by the spring 362 and the slide plate releases the operating lever 327. Thus, the lever 327 is rotated in the counterclockwise direction by the spring 338 to bring the mirror 329 into the optical path and to release the pressing of the arm part 506 of the stop ring 310. Moreover, the projecting part 361b of the plate 361 allows the switch 369 to open. Furthermore, the slide lever 363 descends along the surface of the cam part 361d of the plate 361 and releases first shutter blade 340. Thus, the blade 340 closes the aperture 352 and the condition for still video recording shown in FIG. 18 is attained.

As will be appreciated from foregoing, in the present embodiment, it is possible to utilize the still video recording camera as a motion video camera by addition of a simple mechanical construction. Moreover, the same advantage as that in the first embodiment is also obtained in the second embodiment.

Next, a seventh embodiment of the present invention will be explained hereinbelow with reference to FIGS. 22 to 26.

In a camera mechanism shown in FIG. 22, a solid state image pickup element 511 such as a CCD is arranged to receive an image light through a shutter device described hereinbelow. A shutter base plate 512 is fixedly arranged in front of the pickup element 511 and is provided with an aperture 512a. First and second shutter blades 513 and 514 are arranged to move on the base plate 512 with respect to the aperture 512a to open and close the same. The first and the second blades 513 and 514 respectively constitute parallel link mechanisms together with arm members 515 and 516; and 517 and 518; and are urged downwardly by springs (not shown). Each of the arm members 515 to 518 is pivotally supported on the base plate 512 at respective axes 515a, 516a, 517a and 518a. The arm members 515 and 517 are respectively provided with pins 515b and 517b and arranged to be latched by respective latch members (not shown) in the charged condition shown in the FIG. 22. There are also provided electromagnets (not shown) for the respective latch members to unlatch the latching of the arm members 515 and 517, respectively. When the arm members 515 and 517 are unlatched, the blades 513 and 514 are moved respectively by the charged springs. The above described shutter operating mechanism is well known in the art, especially in the field of the single lens reflex camera.

A normally open type switch 520 is arranged on the base plate 512 so that its contact piece 520a is pushed by a tail part of the arm member 515 and contacts with another contact piece 520b to close the circuit when the first blade 513 starts to open the aperture 512a.

A viewfinder mirror 521 is pivotally mounted on a shaft member 522 and is urged by a spring (not shown) in a counterclockwise direction so that it is placed at a viewing position in the optical path. A stopper pin 521a is provided for the mirror 521. The mirror 521 is provided with pins 521a and 521b on both sides. The pin 521a is engageable with a projected part 534c of an unlatch lever 534. A mirror drive base plate 523 is fixedly arranged on the side of the mirror 521. A main drive lever 524 is pivotally mounted on the base plate 523 at an axis 524a and is urged by a spring 525 in a counterclockwise direction. A mirror drive lever 528 is also pivotally mounted on the base plate 523 at the axis 524a and is urged by a spring 529 in a clockwise direction. An arm part 528a of the mirror drive lever 528 is arranged to engage with the pin 521a of the mirror 521 to push up the same. Thus the mirror 521 is rotated in a clockwise direction to be retracted from an optical path against its spring (not shown). A haul lever 530 is pivotally mounted on an arm part 524b of the main drive lever 524 at an axis 530a and is urged by a spring 531 in a clockwise direction with respect to the lever 524. In the charged condition shown in FIG. 22, a bent part 530b of the haul lever 530 is engaged with a step part 528b of the mirror drive lever 528. A latch lever 526 is pivotally mounted on the base plate 523 at an axis 526a and is urged by a spring 527 in a clockwise direction. In the charged condition shown in FIG. 22, a step part 526b of the latch lever 526 is engaged with an arm part 524c of the main drive lever 524. A mirror return lever 532 is pivotally mounted on the base plate 523 at an axis 532a and is urged by a spring 513 in a clockwise direction. One end part, 532b of the return lever 532 is engaged with an arm part 562b of a cam follower lever 562 and another end part 532c of the lever 532 is engageable with an end part 530c of the haul lever 530. The unlatch lever 534 is mounted on the base plate 523 at an axis 534a and is urged by a spring 535 in a counterclockwise direction. A stopper pin 574 is fixedly provided on the base plate 523 for the unlatch lever 534. The unlatch lever 534 is arranged to be rotated in a clockwise direction by being pushed up by the pin 521a of the mirror 521 at the projected part 534c thereof when the mirror 521 is retracted from the optical path. An arm part 534b of the lever 534 is engageable with an arm part 560b of a latch lever 560 and rotates the lever 560 in a counterclockwise direction against a spring 561 when the lever 534 is rotated in the clockwise direction by the pin 521a. A normally open switch 564 is arranged so that its contact piece 564a is pushed by the pin 521b of the mirror 521 and contacts another contact piece 564b to close the circuit at the completion of retraction of the mirror 521 from the optical path.

A base plate 536 is arranged below the mirror 521. An electromagnet 537 is fixedly arranged on the base plate 536 and has coils 537a and permanent magnets 537b. When the coils 537a are energized, the magnetic attractive forces of the magnets 537b are decreased to release an armature 543. A charge lever 538 is pivotally mounted on the base plate 536 by an axis 538a and has an arm part 538b which is engageable with an arm part 524d of the main drive lever 524 and with a pin 556c of a main charge lever 556. A start lever 541 is pivotally mounted on the base plate 536 at an axis 541a and is urged by an spring 542 in a clockwise direction. The armature 543 is fixedly mounted on an end part of the start lever 541. In the charged condition shown in the Figure, the armature 543 is attracted by the electromagnet 537 and thus the start lever 541 is rotated in a counterclockwise direction against the spring 542. Arm parts 541b and 541c of the start lever 541 are respectively engageable with a pin 538c planted on the charge lever 538 and an end part 526c of the latch lever 526.

A motor 551 is provided for charging the mechanisms. An output shaft 551a of the motor 551 is connected to a gear 553 through a gear train 552. The gear 553 is fixedly attached to a rotation shaft 554. Cams 555, 557 and 558 are also fixedly attached to the shaft 554. The main charge lever 556 is pivotally mounted on a camera frame at an axis 556a and is urged at a spring 572 in a counterclockwise direction. The lever 556 has a cam follower pin 556b which is engageable with the cam 555. When the cam 555 is rotated in a clockwise direction, the main charge lever 556 is rotated in a clockwise direction and thus the charge lever 538 is rotated in a counterclockwise direction through the pin 556c of the lever 556.

Figure 24A:
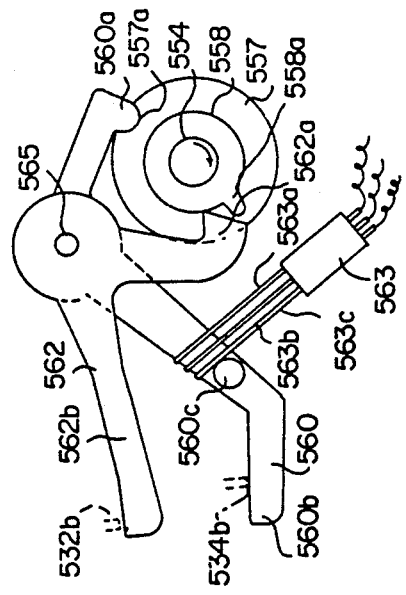
FIGS. 24A and 24B show a part of a charge mechanism in FIG. 22 in different operative conditions, respectively.
Figure 24B:
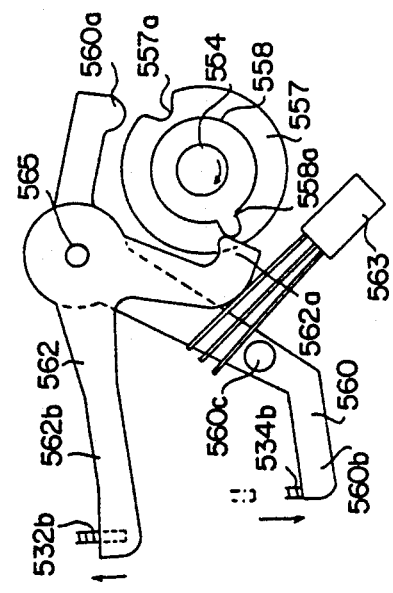

The latch lever 560 is pivotally mounted on a camera frame at an axis 565a and is urged by the spring 561 in a clockwise direction. The lever 560 has a hook part 560a which is engageable in a recess 557a provided on the cam 557. The lever 560 also has a pin 560c which is engageable with and operates a normally open type switch 563. The recess 557a on the cam 557 is provided so that it faces the hook part 560a of the lever 560 at the 560a engages the recess 557a to latch the cam 557 and hence the shaft 554. The switch 563 has three contact pieces 563a, 563b and 563c which are normally separate from each other or when released from pressing by the pin 560c of the latch lever 560 upon rotation of the lever 560 in the counterclockwise direction by the arm part 534b of the unlatch lever 534, as is shown in FIG. 24B. The contact pieces of the switch 563 are brought into contact with each other by being pressed by the pin 560c when the lever 560 rotates in the clockwise direction to a position at which its hook part 560a engages with the recess 557a of the cam 557, as is shown in FIG. 24A.

A cam follower lever 562 is pivotally mounted on a camera frame at the axis 565 together with the latch lever 560. The cam follower lever has a cam follower part 562a which is engageable with the cam 558 and an arm part 562b which is engageable with an arm part 532b of the return lever 532.

Figure 23:
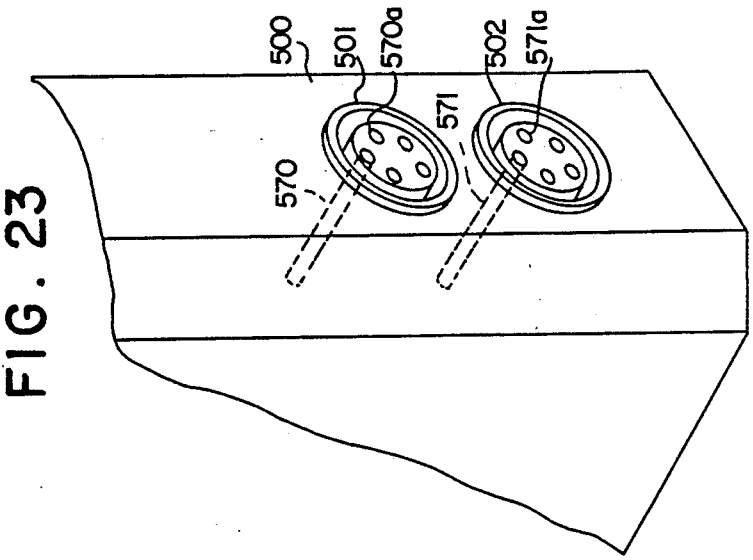
FIG. 23 shows a part of a camera housing of the seventh embodiment.

A mirror retracting lever 566 is pivotally mounted on the base plate 536 at an axis 568 and is urged by a spring 569 in a counterclockwise direction. A pin 567 is planted on an end part of one arm of the lever 566 and is engageable with a bent out part 528c of the mirror drive lever 528 to rotate the same in the counterclockwise direction when the lever 566 is rotated in a clockwise direction against the spring 569. A stopper pin 573 is fixedly provided on the base plate 536 for the lever 566. The lever 566 has a bent up part 566a to receive tail ends 570b and 571b of detection pins 570 and 571. As is shown in FIG. 23, face ends 570a and 571a of the detection pins 570 and 571 are respectively provided to protrude into sockets 501 and 502. The sockets 501 and 502 are provided on a camera housing 500 for connecting an EVF unit and an NTSC adaptor unit, respectively. When the EVF unit and/or the NTSC adaptor unit are connected to the sockets 501 and/or 502, respectively, the pins 570 and/or 571 are pushed in the leftward direction to cause the mirror retracting lever 566 to rotate in the clockwise direction against the spring 569. A normally open type switch 575 having contact pieces 575a and 575b is arranged to be closed by an arm part 566c of the lever 566 when the lever 566 is rotated in the clockwise direction by the pins 570 and/or 571.

A motor 504 is provided for driving a video floppy disc.

Figure 25:
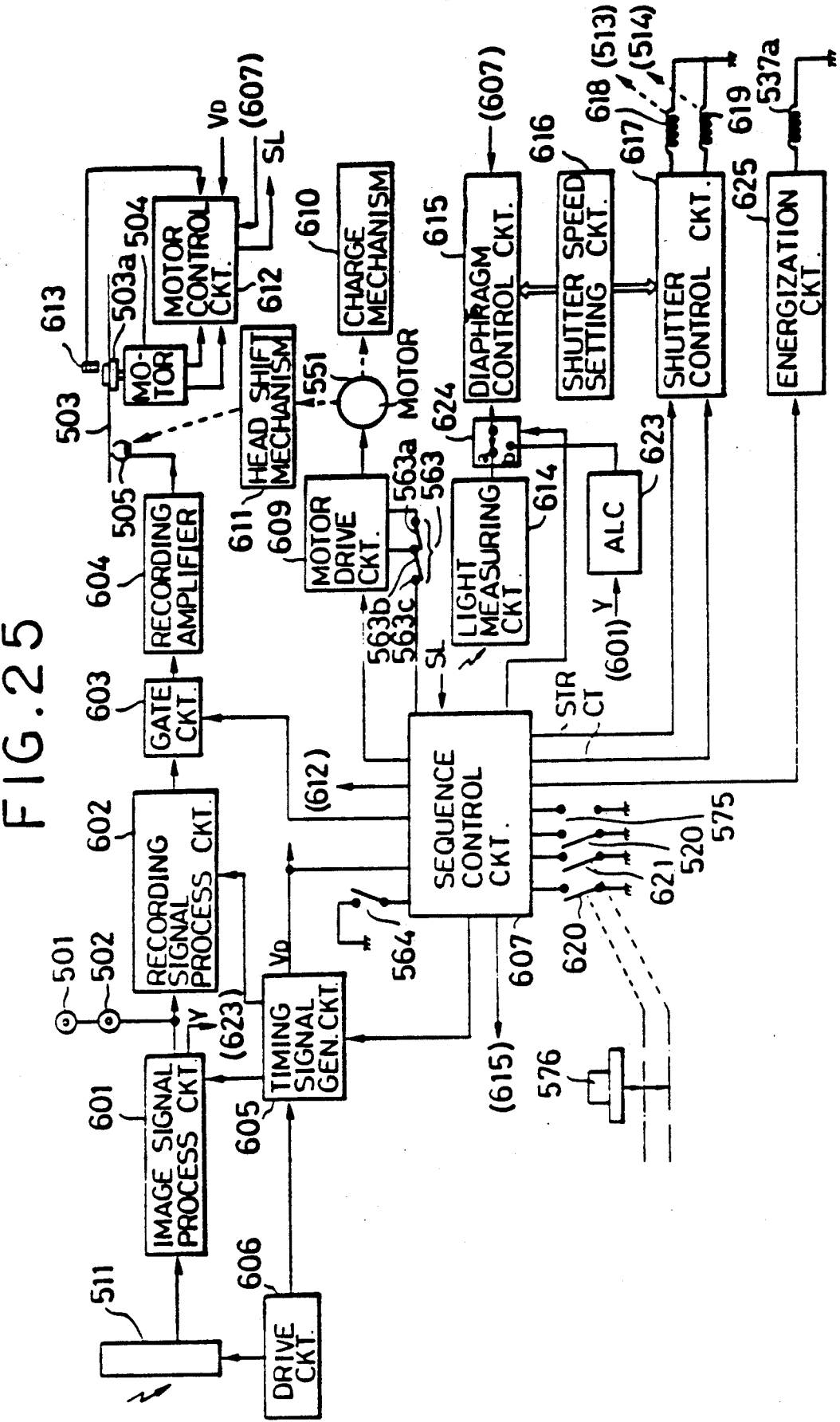
FIG. 25 shows an electrical circuit system of the seventh embodiment.

Next, in the circuit system shown in FIG. 25, a timing signal generation circuit 505 is provided for generating different kinds of timing signals including TV synchronization signals. A drive circuit 506 is connected to drive the image pickup element 511 in response to the timing signals supplied by the generation circuit 505. An image signal processing circuit 501 is connected to receive and process output signals from the image pickup element 511. A recording signal processing circuit 602 is connected to receive and process output signals from the image signal processing circuit 601. The sockets 501 and 502 are also respectively connected to receive output signals from the image signal processing circuit 601. A gate circuit 603 is connected to receive output signals from the recording signal processing circuit 602. A recording amplifier 604 is connected to receive output signals from the gate circuit 603. A magnetic head 505 is connected to receive output signals from the amplifier 604 to record the signals on a magnetic floppy disc 503. The disc 503 is mounted on an output shaft of the motor 504 at its center hub 503a. A motor control circuit 612 is connected to control the rotation speed and phase of the disc 503 through the motor 504 on the basis of the vertical synchronization signal Vo supplied by the generation circuit 605 and a rotation phase signal generated by a rotation detection 613 at a particular phase in one revolution of the disc 613 in a known manner. The motor control circuit 612 is arranged to provide a servo lock signal SL to a sequence control circuit 607 when the rotation of the disc 503 substantially reaches a predetermined speed and a predetermined phase relationship relative to the vertical synchronization signal $V_D$. A head shift mechanism 611 is connected to be driven by the motor 551 to shift the head 505 to a next recording position on the disc 503. A charge mechanism represented by 610, for charging the exposure system is also connected to be driven by the motor 551 as explained hereinbefore. A motor drive circuit 609 is connected to drive the motor 551 under the control of the control circuit 607. The contact pieces 563a and 563b of the switch 563 are connected to the motor drive circuit 609 to make a short circuit for the motor 551 when they contact each other. The contact piece 563c of the switch 563 is connected to the control circuit 607.

A light measuring circuit 614 of known construction is provided for producing an object brightness signal. An automatic lighting control (ALC hereinafter) circuit 623 of known construction is arranged to provide an object brightness signal based on a luminous signal Y produced by the image signal processing circuit 601. A selection switch circuit 624 is connected to select one of the output signals of the circuits 614 and 623 under the control of the control circuit 607. A shutter speed setting circuit 616 is provided for setting a desired shutter speed (exposure time) no longer than the field period (1/60 sec. for NTSC). A diaphragm control circuit 615 is connected to receive output signals from the circuits 616 and 624 to determine and control a diaphragm aperture sized based thereon. A shutter control circuit 617 is connected to control, based on the output signal of the setting circuit 616 and under the control of the control circuit 607, the energization of coils 618 and 619 of electromagnets respectively provided for unlatching the first and the second shutter blades 513 and 514. An energization circuit 625 is connected to energize the coil 537a of the electromagnet 537 under the control of the control circuit 607.

First and second trigger switches 620 and 621 are connected to the control circuit 607 together with the switches 520, 564 and 575. The control circuit 607 controls the entire circuit system based on the conditions of the switches 620, 621, 520, 564 and 575. The first and the second trigger type switches 620 and 629 are respectively of normally open type and are arranged to be closed by a first and a second step respectively, of the depression of a trigger button 576. The control circuit 607 may comprise a micro-computer. The control circuit 607 has a control function shown by the flow chart of FIG. 26.

A diaphragm device shown in FIGS. 2A and 2B, FIG. 5, FIGS. 6A and 6B, FIG. 9, FIGS. 10A and 10B, FIGS. 11A and 11B, FIG. 14 or FIG. 1 may be used in this embodiment.

Next, the operation of this embodiment will be explained with reference to FIGS. 22 to 26.

Figure 22:
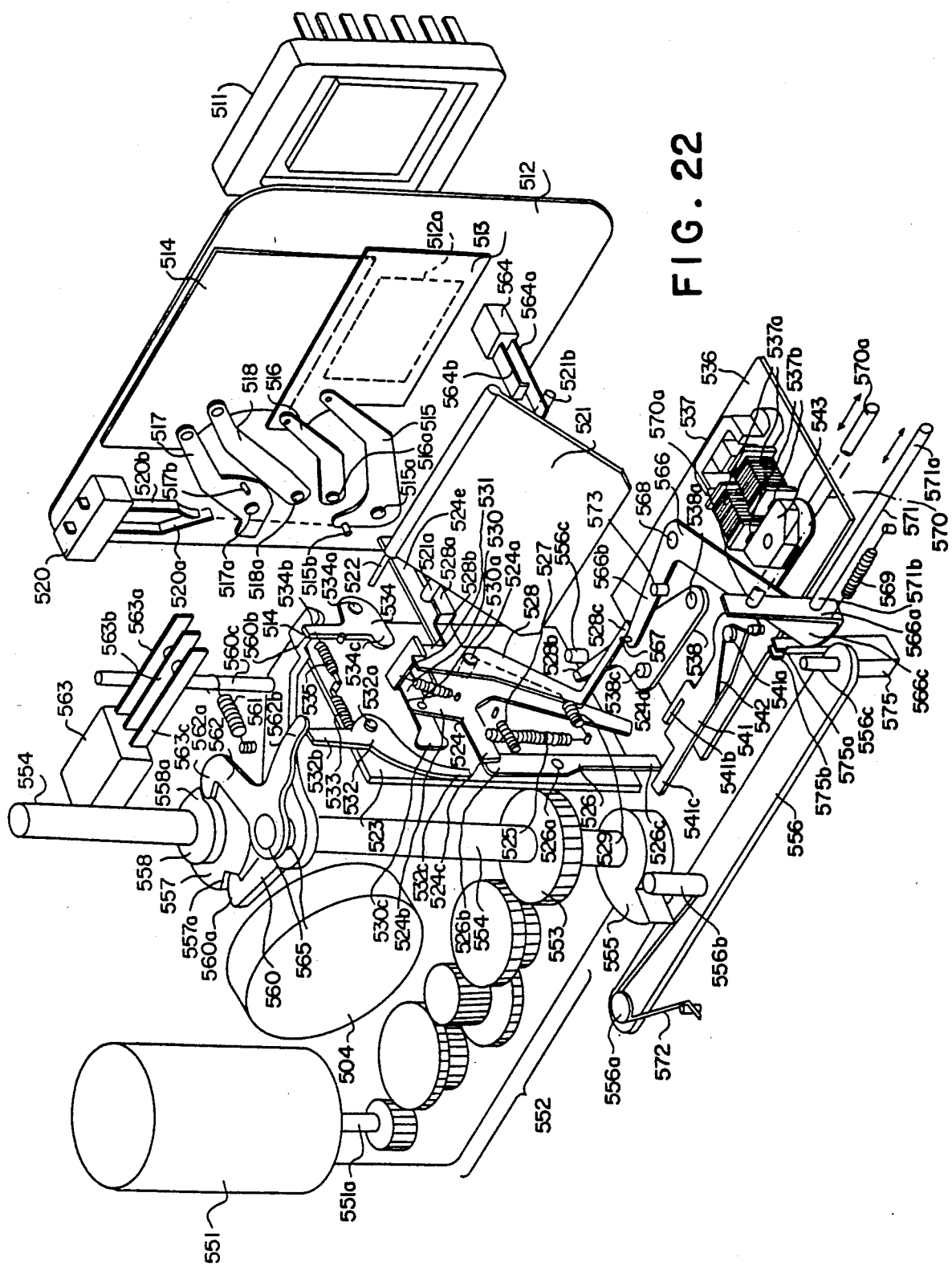
FIG. 22 shows a camera exposure mechanism of a seventh embodiment of the present invention.

When a power switch (not shown) is closed while the apparatus is in the charged condition shown in FIG. 22, the control circuit 607 checks the first trigger switch 620 to ascertain whether it is closed by the depression of the trigger button 576 to the extent of the first step (step S31 in FIG. 26). If the switch 620 is ascertained to be closed, the control circuit 607 then checks the switch 575 to ascertain whether it is open (step S32 in FIG. 26). If the switch 575 is found to be open, this means the designation of a still video recording mode and the control circuit 607 then causes the switch circuit 624 to connect its output to its input terminal a (the output of the light measuring circuit 614) and causes the control signal CT to the shutter control circuit 617 to become low so that the shutter control circuit 617 controls the shutter based on the output signal of the setting circuit 616 (step S33 in FIG. 26). Here, the necessary circuits have been supplied with power by the closure of the power switch (not shown).

After the step S33, the control circuit 607 activates the circuits 605, 612 and 615. By this, the timing signal generation circuit 605 begins to generate the timing signals, including the TV synchronization signals; and based on the timing signals generated by the generation circuit 605, the drive circuit 606 begins to drive the pickup element 511. In this condition, however, no image light impinges upon the pickup element 511 since the view finder mirror 521 is set at the viewing position in the optical path and also the aperture 512a is closed by the first shutter blade 513. On the other hand, the diaphragm control circuit 615 determines the aperture size (stop value) based on the object brightness information supplied by the light measuring circuit 614 through the switch circuit 624 and the shutter speed information supplied by the shutter speed setting circuit 616. The diaphragm control circuit 615 controls the diaphragm device according to the thus determined aperture size. Further, the motor control circuit 612 begins to operate the motor 504 to rotate the disc 503 relative to the head 505. The motor control circuit 612 is arranged to control the rotation of the disc 503 so that the disc 503 rotates at the predetermined speed corresponding to the TV field rate (3,600 rpm for NTSC signal) and at the predetermined phase relationship relative to the vertical synchronization signal $V_D$; and to make the servo lock signal SL high when the rotation of the disc 503 substantially reaches the predetermined speed and phase relationship.

After the step S34, the control circuit 607 repeatedly checks the servo lock signal SL from the motor control circuit 612 to ascertain whether it has become high (step S35 in FIG. 26), and if the signal SL is found to be high, the control circuit 607 then checks the second trigger switch 621 to ascertain whether it has been closed by the depression of the trigger button 576 to the extent of the second step (step S36 in FIG. 26). If the switch 621 is found to be closed, the control circuit 607 immediately activates the energization circuit 625 for a predetermined period of time (t). which is sufficient for releasing; and causes the diaphragm control circuit 615 to hold the determined aperture size (step S37 in FIG. 26). When triggered, the energization circuit 625 energizes the coil 537a of the electromagnet 537 to weaken the magnetic attractive force of the permanent magnets 537b and thus the armature 543 is released. By this, the start lever 541 is rotated in the clockwise direction by the spring 542 while causing, by its tail end part 541c, the latch lever 526 to rotate in the counterclockwise direction against the spring 527. Thus, the main drive lever 524 is unlatched and is rotated in the counterclockwise direction by the spring 525 while hauling the mirror drive lever 528 against the spring 529 through the haul lever 530. When the mirror drive lever 528 is rotated in the counterclockwise direction, the view finder mirror 521 is rotated in the clockwise direction thorough the engagement of its pin 521a with the arm part 528a of the lever 528 and is retracted from the optical path. At the completion of the retraction of the mirror 521 from the optical path, the switch 564 is closed by the pin 521b of the mirror 521. Moreover, the pin 521a pushes the unlatch lever 534 at its projected part 534c and causes the same to rotate in the clockwise direction against the spring 535. Thus, the lever 534 causes, through its arm part 534b, the latch lever 560 to rotate in the counterclockwise direction against the spring 561. Accordingly, the lever 561 releases the latching of the cam 557 by its hook part 561a and the pressing of the contact pieces 563a to 563c of the switch 563 by the pin 560c. Thus, the contact pieces 563a to 563c of the switch revert to their normal, mutually separated condition. This condition is shown in FIG. 24B.

After the step S37, the control circuit 607 repeatedly checks the switch 564 to ascertain whether it is closed (step S38 in FIG. 26). If the switch 564 is found to be closed, the control circuit 607 triggers the shutter control circuit 617 by making a trigger signal STR high in synchronism with the vertical synchronization signal $V_D$ supplied by the generation circuit 605 (step S39 in FIG. 26). When triggered, the shutter control circuit 617 immediately energizes the coil 618 of the electromagnet to unlatch the first shutter blade 513. Thus, the first blade 513 (FIG. 22) is pulled downwardly by the spring (not shown) to open the aperture 512a. In this instance, the shutter control circuit 617 simultaneously starts to count the exposure time set at the setting circuit 616. When the count reaches the set exposure time, the control circuit 617 energizes the coil 619 of the electromagnet to unlatch the second shutter blade 514. Accordingly, the second blade 514 (FIG. 22) is pulled downwardly by the spring (not shown) to close the aperture 512a. Thus, the image pickup element 511 is exposed to the image light coming through the controlled diaphragm aperture for a period of exposure time set at the setting circuit 616.

The image signal generated in the pickup element 511 in response to the exposure to the image light is read out and processed into the recording signal though the processing circuits 601 and 602 in the next field period. Accordingly, the control circuit 607 makes the gate circuit 603 turn on for one field period in synchronism with the next vertical synchronization signal $V_D$ (step S40 in FIG. 26) after the step S39. Thus, the recording signal is supplied to the head 505 through the gate circuit 603 and the amplifier 604 and is recorded along a concentric track on the disc 503.

After the step S40, the control circuit 607 activates the motor drive circuit 609 to drive the motor 551 (step S41 in FIG. 26). Thus, the rotation shaft 554 is rotated together with the cams 555, 557 and 558 in the clockwise direction through the gear train 552 and the gear 553. At this time, the projection 558a of the cam 558 causes the cam follower lever 562 to rotate in the clockwise direction as is shown in FIG. 24B. Thus, the lever 562 causes the return lever 532 to rotate in the counterclockwise direction against the spring 533, which in turn causes the haul lever 530 to rotate in the counterclockwise direction against the spring 531 to thereby release the hauling of the mirror drive lever 528. Accordingly, the lever 528 is rotated in the clockwise direction by the spring 529 and thus the mirror 521 returns to its original viewing position in the optical path. By this, the unlatch lever 534 is freed from the pressure by the pin 521a of the mirror 521 and is rotated in the counterclockwise direction by the spring 535. Thus, the latch lever 560 is freed from the pressure by the unlatch lever 534 and is rotated in the clockwise direction by the spring 561 so that the hook part 560a engages with the circumference of the cam 557. On the other hand, the main charge lever 556 is rotated in the clockwise direction against the spring 572 by the cam 555 through its pin 556b, which in turn rotates the charge lever 538 in the counterclockwise direction through the pin 556c. Thus, the lever 538 rotates the drive lever 524 and the start lever 541 in the clockwise and the counterclockwise direction against the springs 525 and 42, respectively. At the final stage of its counterclockwise rotation, the lever 524 is latched by the latch lever 526 with the spring 525 being charged and the haul lever 530 comes to engage with the mirror drive lever 528. At this time, the arm part 524e of the lever 524 causes the arm members 515 and 517 to rotate in the counterclockwise direction, respectively. Thus, the first and the second shutter blades 513 and 514 are moved upwardly in FIG. 22. Moreover, the armature 543 on the start lever 541 is attracted by the permanent magnets 537b of the electromagnet 537. Further, the head 505 is shifted by one track pitch to the next recording position by the head shift mechanism 611. When the cam 557 has made one revolution and the recess 557a comes to face the hook part 560a of the latch lever 560, the hook part 560a engages into the recess 557a and latches the cam 557. In this instance, the pin 560c of the lever 560 pushes the contact pieces 563a to 563c of the switch 663 to contact with each other. By the closure between the contact pieces 563a and 563b, the motor drive circuit 609 short-circuits the motor 551. When short-circuited, the motor 551 immediately comes to stop and at the same time, generates an electrical voltage by counterelectromotive effect. This voltage is supplied to the control circuit 607 through the connection between the contact pieces 563 and 563c. On the hand, the control circuit 607 repeatedly checks the voltage level at this input connected to the contact piece 563c of the switch to ascertain whether the switch 563 is closed (step S42 in FIG. 26) after the step S41. If the voltage lever is found to be high due to the closure of the switch 563, the control circuit 607 deactivates the circuits 605, 609, 612 and 615 and thus the camera stops its operation after the condition shown in FIG. 22 has been attained by the charging.

On the other hand, if the EVF unit and/or the NTSC adaptor unit are connected by plugs to the sockets 501 and/or 502 respectively, the detection pins 570 and /or 571 are moved in leftward in FIG. 22 and cause the mirror retracting lever 566 to rotate in the clockwise direction against the spring 569. By this, the pin 567 on the lever 566 causes the mirror drive lever 528 to rotate in the counterclockwise direction against the spring 529 through its bent part 528c. Thus, the mirror 521 is retracted from the optical path and the latch lever 560 is caused to release the latching of the cam 557 by the unlatch lever 534 in the same way, as explained hereinbefore. At this time, the switch 575 is closed by the arm part 566c of the lever 566. Accordingly, the control circuit 607 finds at the step S32 that the switch 575 is not open. This means that the motion video mode has been designated. As a result, the process goes to a step S44 in FIG. 26 where the control circuit 607 causes the switch circuit 624 to connect its output to its input terminal b (the output of the ALC circuit 623) and makes the control signal CT high to cause the shutter control circuit 617 to be insensitive to the output of the setting circuit 616. Then, the control circuit 607 activates the circuits 605 and 615 (step S45 in FIG. 26). Thus, the driving of the pickup element 511 by the drive circuit 606 is started. The control circuit 607 then triggers the shutter control circuit 617 by making the trigger signal STR high (step S46 in FIG. 26). In response thereto, the shutter control circuit 617 energizes the coil 618 of the electromagnet for unlatching the first shutter blade 513. Thus, the first shutter blade 513 moves downwardly to open the aperture 502a. On the other hand, the diaphragm control circuit 615 continuously controls the aperture size of the diaphragm device based on the output signal of the ALC circuit 623 which produces the brightness signal in response to the luminous signal Y supplied by the image signal processing circuit 601. Thus, the camera operates in the motion video mode like a normal video camera; and at this time, the motion video signal produced by the processing circuit 601 can be picked up through the sockets 501 and 502 by the EVF unit and the NTSC adaptor unit, respectively. This condition is maintained as long as the switch 620 is kept closed.

After the step S46, the control circuit 607 begins to repeatedly check the switch 620 to ascertain whether it has become open (step S47 in FIG. 26). If the switch 620 is found to be open, the control circuit 607 activates the energization circuit 625 for the predetermined period of time (T)(step S48 in FIG. 26). Thus, the start lever 541 is released and this in turn releases the latching of the main drive lever 524 by the latch lever 526. Then, the control circuit 607 activates the motor drive circuit 609 to drive the motor 551 (step S49 in FIG. 26). Thus, the shaft 554 is rotated in the clockwise direction and the main drive lever 524 and the start lever 541 are reset by the cam 555 through the charge levers 556 and 538.

Moreover, the first shutter blade 513 is reset to close the aperture 512a by the arm part 524e of the drive lever 524. In this case, however, the latch lever 560 is kept at the unlatching position shown in FIG. 24B by the pin 521a of the raised mirror 521 through the unlatch lever 534. Therefore, the control circuit 607 checks the switch 520 instead of the switch 563 to ascertain whether it has become open (step S50 in FIG. 26) after step S49. If the switch 520 is found to be open, this means that the resetting of the first shutter blade 513 to the closing position; and hence the charging of the mechanism has been completed. Therefore, the control circuit 607 deactivates the circuits 605, 609 and 615. Thus, the camera stops its operation. In this case, the cam 557 is stopped in a phase where its recess 557a substantially faces the hook part 560a of the latch lever 560.

As will be appreciated from the foregoing, in the present embodiment, it is possible to set the still video recording camera in a motion video mode by a simple operation of connecting an external unit for the motion video pickup to the camera. Furthermore, the shutter is opened and closed by the operation of the trigger switch and therefore, the image pickup element and especially, its color filter are protected from being damaged by the direct impingement of high intensity light such as a sun light. The opening and closing of the shutter in the motion video mode may be controlled by the operation of the power switch instead of the trigger switch.

As will readily be appreciated from foregoing, with the present invention, the retraction and the resetting of the viewfinder optical means relative to the optical path can be performed utilizing the movement of the output member of the prime mover means in the first and the second direction, respectively and therefore, the mechanism for operating the optical means and hence the camera mechanism can be made simple and compact and reliable operation of the optical means is assured.

Furthermore, with the present invention, it becomes possible to utilize the still video type camera as a usual motion video camera by adding a simple mechanical structure.

Furthermore, with the present invention, it becomes possible to set the still video type camera in a motion video mode by a simple operation of connecting an external device to the socket means.

The present invention will not necessarily be limited to the above mentioned embodiments but many modifications and applications can be made within the scope of the appended claims.

What is claimed is:

1. A camera comprising
image pickup means for producing an electrical image signal in response to an image light passing along an optical path;
view finder optical means moveable into and away from the optical path;
shutter means for exposing said pickup means to the image light;
first means for temporarily retracting said optical means from the optical path;
second means for opening said shutter means for a controlled period of time in synchronism with the retraction of said optical means by said first means; and
third means for maintaining said optical means in the retracted condition and said shutter means in the opened condition.

2. A camera according to claim 1, wherein said third means includes:
manually operable means for retracting said optical means from the optical path and for opening said shutter means; and
releasable lock means for locking said operable means in an operated condition.

3. A camera according to claim 1, further comprising:
socket means for enabling an external device to be connected to receive the image signal produced by said pickup means;
wherein said third means includes:
detection means for detecting the connection of the external device to said socket means; and
retracting means responsive to said detection means to retract said optical means from the optical path when the external device is connected to said socket means.

4. A camera according to claim 3, further comprising:
manually operable trigger means;
wherein said third means further includes:
control means responsive to said detection means nd to said trigger means for maintaining said shutter means in the opened condition so long as said trigger means is operated when said detection means detects the connection of the external device to said socket means.

5. A camera according to claim 1, wherein said first means includes:
retracting means operative by charged energy to retract said optical means from the optical path;
charging means for charging said retracting means with energy; and
motor means connected to drive said charging means.

6. A camera according to claim 5, wherein said first means further includes:
returning means responsive to said motor means to return said optical means to an original position in the optical path.

7. A camera according to claim 6, wherein said first means further includes:
latch means for latching said retracting means in the charged condition; and
release means for releasing the latching of said retracting means by said latch means.

8. A camera according to claim 7, wherein said release means is arranged to responds to said motor means to release said latching.

9. A camera according to claim 8, wherein said motor means has an output member alternatively rotatable in first and second directions;
said release means being responsive to the rotation of said output member of said motor means in said first direction; and
said charging means and said returning means being responsive to the rotation of said output member of said motor means in said second direction.

10. A camera according to claim 7, wherein said release means includes electromagnet means to release said latching.

11. A camera according to claim 10, further comprising manually operable trigger means to release said latching.

12. A camera according to claim 1, further comprising:

recording means for recording a predetermined image signal produced by said pickup means.

13. A camera according to claim 12, wherein said recording means includes a magnetic disc recording device.

14. A camera comprising:
   image pickup means for producing an electrical image signal in response to an image light passing along an optical path;
   view finder optical means moveable into and away from the optical path;
   shutter means for exposing said pickup means to the image light;
   socket means for enabling an external device to be connected to receive the image signal produced by said pickup means;
   detection means for detecting the connection of the external device device to said socket means;
   first means responsive to said detection means to retract said optical means from the optical path; and
   second means responsive to said detection means to open said shutter means.

15. A camera according to claim 14, further comprising
   manually operable trigger means;
   said second means being further responsive to said trigger means to maintain said shutter means in the opened condition when said trigger means is operated while said detection means detects the connection of the external device to said socket means.

16. A camera according to claim 14, further comprising
   recording means for recording a predetermined image signal produced by said pickup means.

17. A camera according to claim 14, wherein said recording means includes a magnetic disc recording device.

* * * * *

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 1:

Line 34, "AF" should read --AE--; and
    Line 55, "et" should read --set--.

COLUMN 2:

Line 5, "circuit 102" should read --circuit 101--; and
    Line 33, "shutter" should read --the shutter--;

COLUMN 3:

Line 56, "the" should read --them--.

COLUMN 4:

Line 7, "member," should read --members,--.

COLUMN 5:

Line 33, "tion." should read --tions.--, and
    Line 35, "position." should read --positions.--.

COLUMN 7:

Line 1, "with" should read --by--;
    Line 3, "direction," should read --directions,--; and
    Line 9, "an" should read --a--.

COLUMN 9:

Line 14, "lever 20" should read --lever 30--; and
    Line 32, "arm" should read --tail--.

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 10:

Line 4, "valve" should read --value--;
    Line 49, "valve" should read --value--;
    Line 55, "valve" should read --value--; and
    Line 59, "valve" should read --value--.

COLUMN 11:

Line 21, "central" should read --control--;
    Line 39, "line 35a" should read --line 35a'--; and
    Line 67, "210" should read --218--.

COLUMN 12:

Line 14, "wisely" should read --wise--;
    Line 64, "mecha-" should be deleted; and
    Line 65, "nism is returned to that" should be deleted.

COLUMN 13:

Line 30, "blade I" should read --blade 1--;
    Line 31, "member II" should read --member 11--; and
    Line 62, "nal 2." should read --nal 220.--.

COLUMN 14:

Line 4, "circuit 251" should read --circuit 201--.

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 15:

Line 18, "40'" should read --40--; and
    Line 25, "spring 4," should read --spring 4 and--.

COLUMN 16:

Line 5, "drive" should read --trigger--;
    Line 26, "circuit 201" should read --circuit 223--;
    Line 33, "foregoing," should read --the foregoing--;
    Line 51, "prt" should read --part--; and
    Line 59, "305c" should read --305b--.

COLUMN 17:

Line 6, "and" should read --,--;
    Line 23, "312a" should read --312b--; and
    Line 64, "pivotted" should read --pivoted--.

COLUMN 18:

Line 14, "lever" should read --lever 333 is--;
    Line 19, "that part 334a engages with a recess part 315a of the a" should be deleted; and
    Line 20, "hook" should read --that a hook--.

COLUMN 19:

Line 50, "step" should read --steps--; and
    Line 68, "0" should be deleted.

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 20:

Line 52, "the 305b" should read --the pin 305b--.

COLUMN 22:

Line 9, "next" should be deleted; and
    Line 24, "circuit 410" should read --circuit 401--.

COLUMN 24:

Line 40, "is" should be deleted;
    Line 51, "the" (first occurrence) should read --then--;
    Line 52, "Fig. 16)." should read --Fig. 21).--; and
    Line 55, "applied" should read --supplied, and "elements 411" should read --element 411--.

COLUMN 25:

Line 20, "spring 362" should read --spring 368--;
    Line 24, "part 506" should read --part 310b--; and
    Line 50, "516; and" should read --516 and arm members--.

COLUMN 27:

Line 14, "at" should read --by--;
    Line 23, "axis 565a" should read --axis 565--;
    Line 29, "lever 560 at the" should read --lever 560 at the completion of the charging. At that time the hook part--; and
    Line 33, "or when" should read --and are--.

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 28:

Line 9, "circuit 505" should read --circuit 605--;
Line 11, "circuit 506" should read --circuit 606--;
Line 13, "circuit 505. should read --circuit 605.-;
Line 14, "circuit 501" should read --circuit 601--;
Line 31, "signal $V_O$" should read --signal $V_D$--; and
Line 34, "disc 613" should read --disc 503--.

COLUMN 29:

Line 12, "switches 620 and 629" should read --switches 620 and 621--; and
Line 14, "step" should read --steps--.

COLUMN 30:

Line 30, "view" should read --viewfinder--;
Line 32, "thorough" should read --through--;
Line 42, "lever 561" should read --lever 560--; and
Line 43, "part 561a" should read --part 560a--.

COLUMN 31:

Line 45, "42," should read --542,--.

COLUMN 32:

Line 2, "pieces 563 and 563c." should read --pieces 563a to 563c.--;
Line 3, "hand," should read --other hand,--;
Line 43, "aperture 502a." should read --aperture 512a.--; and
Line 61, "time (T)" should read --time (+)--.

UNITED STATES PATENT AND TRADEMARK OFFICE
CERTIFICATE OF CORRECTION

PATENT NO. : 5,032,863

DATED : July 16, 1991

INVENTOR(S) : NOBUAKI DATE, ET AL.

It is certified that error appears in the above-identified patent and that said Letters Patent is hereby corrected as shown below:

COLUMN 33:

Line 55, "comprising" should read --comprising:--.

COLUMN 34:

Line 26, "nd" should read --and--;
    Line 50, "responds" should read --respond--; and
    Line 65, "ing manually" should read --ing:
        ¶ manually--.

COLUMN 35:

Line 21, "device" (second occurrence) should be deleted.

COLUMN 36:

Line 15, "ing" should read --ing:--; and
    Line 18, "claim 14," should read --claim 16,--.

Signed and Sealed this

Twelfth Day of October, 1993

Attest:

BRUCE LEHMAN

Attesting Officer    Commissioner of Patents and Trademarks